United States Patent
Edgar et al.

(10) Patent No.: US 9,624,311 B2
(45) Date of Patent: Apr. 18, 2017

(54) REGIOSELECTIVELY SUBSTITUTED CELLULOSE ESTERS AND EFFICIENT METHODS OF PREPARING THEM

(71) Applicants: Kevin Edgar, Blacksburg, VA (US); Daiqiang Xu, Newark, DE (US); Xueyan Zheng, Blacksburg, VA (US)

(72) Inventors: Kevin Edgar, Blacksburg, VA (US); Daiqiang Xu, Newark, DE (US); Xueyan Zheng, Blacksburg, VA (US)

(73) Assignee: VTIP Intellectual Properties, Inc., Blacksburg, VA (US)

(*) Notice: Subject to any disclaimer, the term of this patent is extended or adjusted under 35 U.S.C. 154(b) by 0 days.

(21) Appl. No.: 14/513,855

(22) Filed: Oct. 14, 2014

(65) Prior Publication Data
US 2015/0038695 A1 Feb. 5, 2015

Related U.S. Application Data

(62) Division of application No. 13/661,028, filed on Oct. 25, 2012.

(60) Provisional application No. 61/550,952, filed on Oct. 25, 2011.

(51) Int. Cl.
| C08B 3/24 | (2006.01) |
|---|---|
| C08B 3/00 | (2006.01) |
| C08B 3/06 | (2006.01) |
| C08J 5/18 | (2006.01) |
| C08L 1/10 | (2006.01) |
| C08B 3/08 | (2006.01) |
| C08B 3/16 | (2006.01) |

(52) U.S. Cl.
CPC .......... *C08B 3/24* (2013.01); *C08B 3/00* (2013.01); *C08B 3/06* (2013.01); *C08B 3/08* (2013.01); *C08B 3/16* (2013.01); *C08J 5/18* (2013.01); *C08L 1/10* (2013.01); *C08J 2301/10* (2013.01)

(58) Field of Classification Search
None
See application file for complete search history.

(56) References Cited

U.S. PATENT DOCUMENTS

| 1,683,347 | A | 9/1928 | Gray et al. |
|---|---|---|---|
| 1,698,049 | A | 1/1929 | Clarke et al. |
| 1,880,560 | A | 10/1932 | Webber et al. |
| 1,880,808 | A | 10/1932 | Clarke et al. |
| 1,984,147 | A | 12/1934 | Malm |
| 2,129,052 | A | 9/1938 | Fordyce |
| 2,836,590 | A | 5/1958 | Turner |
| 3,617,201 | A | 11/1971 | Berni et al. |
| 4,543,221 | A * | 9/1985 | Chen ............ B01D 69/08 210/500.23 |
| 5,124,446 | A | 6/1992 | Gruning et al. |
| 5,453,497 | A * | 9/1995 | Kamiya ............ C07H 19/06 536/28.5 |
| 6,228,997 | B1 | 5/2001 | Akkara et al. |
| 6,489,468 | B1 | 12/2002 | Klohr et al. |
| 7,083,752 | B2 | 8/2006 | Bermel |
| 7,276,546 | B2 | 10/2007 | Buchanan et al. |
| 8,273,872 | B2 | 9/2012 | Buchanan et al. |
| 2002/0136892 | A1 * | 9/2002 | Kim ............ D01D 5/24 428/364 |

(Continued)

FOREIGN PATENT DOCUMENTS

WO 2013063336 A 5/2013

OTHER PUBLICATIONS

Kumar, A., & Manetsch, R. (2014). Regioselective O2', O3'-Deacetylations of Peracetylated Ribonucleosides by Using Tetra-n-butylammonium Fluoride. European Journal of Organic Chemistry, 2014(17), 3551-3555.*

(Continued)

*Primary Examiner* — Shaojia Anna Jiang
*Assistant Examiner* — Dale R Miller
(74) *Attorney, Agent, or Firm* — New River Valley IP Law, PC; Michele L. Mayberry

(57) ABSTRACT

Embodiments of the invention provide regioselectively substituted carbohydrate and polysaccharide derivatives, such as cellulose esters, and methods for preparing them. Particular methods of the invention include deacylation of esters using tetrabutylammonium fluoride to obtain selective substitution at desired hydroxyl position(s) of the ester. Preferred is deacylation of an ester, which shows selectivity for removal of acyl groups from the ester of the secondary alcohols at C-2 and C-3, and which affords cellulose-6-O-esters with high regioselectivity by a simple one-step process employing no protective groups. Inventive regioselectively substituted cellulose esters can be prepared by such methods to obtain esters with the following anhydroglucose repeating units:

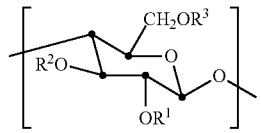

wherein $R^1$, $R^2$, and $R^3$ are each independently chosen from a hydrogen atom, and, whether substituted or unsubstituted, branched or unbranched, an alkanoyl group, an aroyl group, and a heteroaroyl group. In embodiments, the alkanoyl, aroyl and heteroaroyl groups can comprise from 1-20 carbon atoms.

9 Claims, 2 Drawing Sheets

(56) References Cited

U.S. PATENT DOCUMENTS

| | | | |
|---|---|---|---|
| 2009/0011033 A1* | 1/2009 | Hauser | C08B 7/00 424/494 |
| 2010/0029927 A1 | 2/2010 | Buchanan et al. | |
| 2010/0267942 A1 | 10/2010 | Buchanan et al. | |
| 2012/0003404 A1 | 1/2012 | Hamlin | |
| 2013/0178614 A1 | 7/2013 | Edgar et al. | |

OTHER PUBLICATIONS

Nowak, I., Jones, C. T., & Robins, M. J. (2006). Selective Removal of the 2'-and 3'-O-Acyl Groups from 2', 3', 5'-Tri-O-acylribonucleoside Derivatives with Lithium Trifluoroethoxide1. The Journal of organic chemistry, 71(8), 3077-3081.*

Altaner et al., "Regioselective deacetylation of cellulose acetates by acetyl xylan esterases of different CE-families." Journal of Biotechnology, 105, pp. 95-104 (2003).

Casarano, R., Nawaz, H., Possidonio, S., da Silva, V. i. C., El Seoud, O. A., "A Convenient Solvent System for Cellulose Dissolution and Derivatization: Mechanistic Aspects of the Acylation of the Biopolymer in Tetraallylammonium Fluoride/Dimethyl Sulfoxide," Carbohydr. Polym., 86 (2011), 1395-1402.

Co-Pending U.S. Appl. No. 13/661,028, Advisory Action dated Apr. 17, 2015, 11 pages.

Co-Pending U.S. Appl. No. 13/661,028, Final Office Action dated Jan. 7, 2015, 16 pages.

Co-Pending U.S. Appl. No. 13/661,028, Non-Final Office Action dated Apr. 11, 2014, 19 pages.

Co-Pending U.S. Appl. No. 13/661,028, Response to Apr. 11, 2014 Non-Final Office Action filed Oct. 14, 2014, 7 pages.

Co-Pending U.S. Appl. No. 13/661,028, Response to Jan. 7, 2015 Final Office Action filed Apr. 6, 2015, 12 pages.

Co-Pending International Application No. PCT/US12/62011 filed Oct. 25, 2012 and published as International Publication No. WO2013/063336 on May 2, 2013.

Fox, S.C., et al., "Regioselective Esterification and Etherification of Cellulose: A Review", Biomacromolecules, 2011, vol. 12, pp. 1956-1972.

Gu, Guofeng, et al., Efficient and selective removal of chloroacetyl group promoted with tetra-n-butylammonium fluoride (TBAF), Carbohydrate Research 346 (2011) 2801-2804.

International Search Report and Written Opinion of International Application No. PCT/US12/62011, dated Mar. 18, 2013.

Namikoshi, M.; Kundu, B.; Rinehart, K. L., Use of Tetrabulylammonium Fluoride as a Facile Deprotecting Reagent for 4-Nitrobenzyl,2,2,2-Trichloroethyl, and Phenacyl Esters of Amino Acids, J. Org. Chem. 1991, 56, 5464-5466.

Ostrovskaya, "New test tools for determination of trace metals using polydentate cellulose." Fresenius J Anal Chem, 361, pp. 303-305 (1998).

Toga et al., "Dependence of chiral recognition on the degree of substitution of cellulose benzoat." Cellulose (11): pp. 65-71 (2004).

Ueki, M., Aoki, H., Katoh, T., "Selective Removal of Phenacyl Ester Group with a TBAF-xH2O-Thiol System from Amino Acid Derivatives Containing Benzyl or 4-Nitrobenzyl Ester," Tet. Lett. 1993, vol. 34, No. 17, 2783-2786.

Xu et al., "TBAF and cellulose ester: unexpected deacylation with unexpected regioselectivity", Biomacromolecules, 2012, vol. 13, p. 299-303.

Zheng et al., "TBAF-catalyzed deacylation of cellulose esters: Reaction scope and influence of reaction parameters." Carbohydrate Polymers, 98, pp. 692-698 (2013).

Co-Pending U.S. Appl. No. 13/661,028, Non-Final Office Action dated Jan. 14, 2016 and Response dated Jun. 14, 2016, 34 pages.

Granstrom, M. et al (2008), Tosylation and acylation of cellulose in 1-allyl-3-methylimidazolium chloride, Cellulose, 15 (3), 481-488.

Hasegawa, M. et al (1992), Dissolving states of cellulose and chitosan in trifluoroacetic acid, J. Appied Polymer Sci., 45(10), 1857-1863.

* cited by examiner

HMBC spectrum of CA (DS$_6$ 0.79, DS$_{2,3}$ 0.09)

REGIOSELECTIVELY SUBSTITUTED CELLULOSE ESTERS AND EFFICIENT METHODS OF PREPARING THEM

CROSS-REFERENCE TO RELATED APPLICATIONS

This application is a Divisional Application of U.S. application Ser. No. 13/661,028 filed Oct. 25, 2012, which relies on the disclosure of and claims priority to and the benefit of the filing date of U.S. Provisional Application No. 61/550,952, filed Oct. 25, 2011, the entire disclosures of which are hereby incorporated herein by reference.

STATEMENT OF GOVERNMENT INTEREST

This invention was made with government support under Contract No. 2011-67009-20090 awarded by United States Department of Agriculture, National Institute of Food and Agriculture. The government has certain rights in the invention.

BACKGROUND OF THE INVENTION

Field of the Invention

The present invention relates to the field of chemistry. More particularly, embodiments of the invention provide regioselectively substituted carbohydrate and polysaccharide derivatives, such as cellulose esters, and methods for preparing them.

Description of Related Art

Cellulose is one of the most abundant natural polymers on earth, consisting of unsubstituted, unbranched β(1→4) linked D-glucose units:

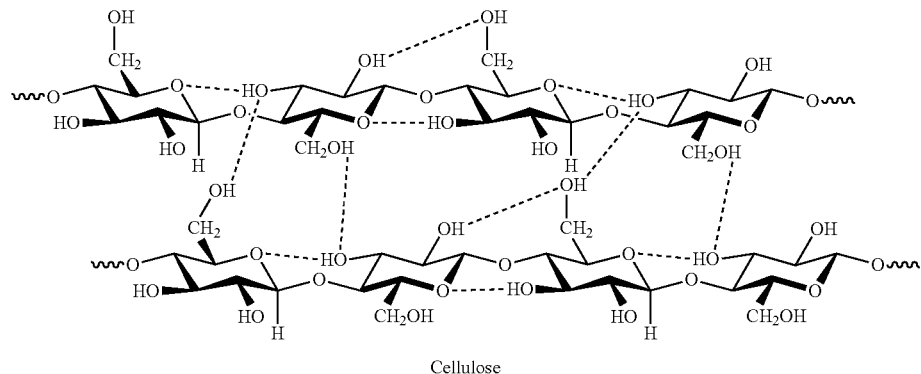

Cellulose

Cellulose comprises several thousand glucose units linked in a linear fashion. The chains are stabilized by intramolecular and intermolecular hydrogen bonds (shown as the dashed lines in the structure provided above). Cellulose esters can be prepared by reacting the hydroxyl groups of cellulose with acids or other acylating agents. Less than fully substituted cellulose esters (i.e., having a degree of substitution (DS) of less than 3) are used in various applications. For example, such compounds find use in molding plastics, clear sheets, filter tow, and as coatings polymers. In particular, acetylation with acetic acid or acetic anhydride produces a variety of different products with properties that depend on the degree of substitution.

It has been found that regioselectivity of substitution can have a strong impact on the physical properties of the resultant compounds. For example, solubility, optical properties, thermal properties, and crystallinity have all been shown to be strongly dependent on regioselectivity. See Kondo, T. J., Polym. Sci., Part B: Polym. Phys. 1997, 35, 717; and see Fox, S. C.; Edgar, K. J., Cellulose 2011, 18, 1305; and see Buchanan, C. M.; Buchanan, N. L.; Guzman-Morales, E., "Control of regioselectivity during esterification of cellulose", CELL-10, Abstracts of Papers, American Chemical Society National Meeting, San Francisco, Calif., United States, Mar. 21-25, 2010; and see Iwata, T.; Fukushima, A.; Okamura, K.; Azuma, J., J. Appl. Polym. Sci. 1997, 65, 1511; and see Iwata, T.; Okamura, K.; Azuma, J.; Tanaka, F., Cellulose 1996, 3, 91; and see Iwata, T.; Okamura, K.; Azuma, J.; Tanaka, F., Cellulose 1996, 3, 107. The ability to prepare cellulose esters having a high degree of control over the position of substitution is, however, a very difficult problem in organic chemistry, polymer science, analytical chemistry, and materials science.

The paucity of general solutions to this problem is a limiting factor in the development of novel materials from renewable cellulose, which are an important part of a biorefinery-based economy. See Edgar, K. J.; Buchanan, C. M.; Debenham, J. S.; Rundquist, P. A.; Seiler, B. D.; Shelton, M. C.; Tindall, D., Prog. Polym. Sci. 2001, 26, 1605; and see Klemm, D.; Heublien, B.; Fink, H.-P.; Bohn, A., Angew. Chem., Int. Ed. 2005, 44, 3358; and see Fox, S. C.; Li, B.; Xu, D.; Edgar, K. J., Biomacromolecules 2011, 12, 1956 ("Fox 1956"). Thus, it is of great interest to develop new synthetic pathways for regioselectively substituted cellulose esters, which is crucial for understanding their structure-property relationships and design of cellulose derivatives with unique properties, like crystallinity, thermal properties, solubility, and optical properties. See Iwata, T., Okamura, K., Azuma, J. Tanaka, F., Cellulose 1996, 3; and see Iwata, T., Okamura, K., Azuma, J. Tanaka, F., Cellulose 1996, 3; and see Iwata, T., Fukushima, A., Okamura, K., Azuma, J., J. Appl. Polym. Sci. 1997, 65; and see Kondo, T., J. Polym. Sci., Part B: Polym. Phys. 1994, 32; and see Buchanan, C. M. B., N. L.; Guzman-Morales, E.; Wang, B., "Control of regioselectivity during esterification of cellulose", CELL-10, Abstracts of Papers, ACS National Meeting, San Francisco, Calif., United States, Mar. 21-25, 2010.

In light of the low reactivity of cellulosic hydroxyl groups resulting from the hydrogen and hydrophobic bonding, poor solubility, and steric hindrance, it is quite challenging to synthesize regioselectively substituted cellulose esters. Modern cellulose solvent systems, such as LiCl/N, N-dimethylacetamide (DMAc), dimethylsulfoxide (DMSO)/tetrabutylammonium fluoride trihydrate (TBAF, which can include the trihydrate), and ionic liquids, enhance the cellulosic OH reactivity by breaking up the extensive hydrogen bonding. See Liebert, T., Heinze, T., Biomacromolecules 2005, 6, 333, see Edgar, K. J., Arnold, K. M., Blount, W. W., Lawniczak, J. E., Lowman, D. W. Macromolecules 1995, 28, pp 4122-4128, see Kohler, S., Heinze, T. Macromolecular Bioscience 2007, 7, 307, and see El Seoud, O., A. Koschella, A., Fidale, L. C., Dorn, S., Heinze, T. Biomacromolecules 2007, 8, 2629. The relatively small reactivity differences between the 2-, 3-, and 6-OH groups, however, make selectivity very difficult to achieve, especially for esterification reactions, in which direct esterification of cellulose with sterically demanding acylating reagents provided only modest selectivity on 6-OH. See Xu, D., Li, B., Tate, C., Edgar, K. J. Cellulose 2011, 18, pp 405-419.

It is believed that the difficulty of regioselective substitution arises because of the low reactivity of cellulosic hydroxyls towards electrophiles, due to the restricted steric access, mobility, and wetting imposed by the linear, hydrophilic cellulose polymer structure. Often aggressive reaction conditions are required to drive reactions like esterification and etherification. The resulting necessity of using strong catalysts, high temperatures, and/or large molar excesses of reagents is not conducive to selectivity.

The advent of solvents for cellulose has facilitated the first significantly regioselective syntheses of cellulose ethers and esters, by permitting the use of milder reaction conditions and reagents. Protection/deprotection chemistry is one of the most common strategies for the synthesis of regioselectively substituted cellulose derivatives. Prior attempts to synthesize cellulose esters with high regioselectivity have involved the use of protective groups, which can significantly reduce overall yield, require high chemo- and regioselectivity in each of several steps, and can themselves reduce the reactivity of cellulose and impede succeeding reactions, as well as increase overall cost. See Fox 1956.

One of the few most interesting solvents for modification of cellulose has been dimethylsulfoxide (DMSO) containing tetrabutylammonium fluoride (TBAF). See Kohler, S.; Heinze, T., Macromol. Biosci. 2007, 7, 307. DMSO/TBAF dissolves cellulose faster and under milder conditions (room temperature, 15 min for degree of polymerization (DP) <650) than any other cellulose solvent. Cellulose ether synthesis in DMSO/TBAF is effective, but several researchers have noted that the synthesis of cellulose esters in this solvent is of limited scope due to the low degree of substitution (DS) of the products obtained. See Ramos, L. A.; Frollini, E.; Heinze, T., Carbohydr. Polym. 2005, 60, 259; and see Ass, B. A.; Frollini, E.; Heinze, T., Macromol. Biosci. 2004, 4, 1008; and see Xu, D.; Li, B.; Tate, C.; Edgar, K. J., Cellulose 2011, 18, 405; and see Hussain, M. A.; Liebert, T.; Heinze, T., Macromol. Rapid Commun. 2004, 25, 916. It is believed that TBAF is roughly a trihydrate and that reaction of the waters of hydration (in preference to cellulose) with the acylating reagent is cited as the probable cause of low DS ester products. What is more, the TBAF trihydrate is difficult to break by drying processes and attempts to do so result in β-elimination reactions of the TBA (tetrabutylammonium) moiety, degrading the TBAF salt. See Sun, H.; DiMagno, S. G. J. Am. Chem. Soc. 2005, 127, 2050.

Close examination of the literature has revealed a few hints of the possibility of fluoride-catalyzed deacylation. For example, Bunton and Fendler investigated the catalysis of acetic and propionic anhydride hydrolyses by fluoride ion (NaF or KF). See Bunton, C. A., Fendler, J. H., "Fluoride Ion Catalyzed Hydrolysis of Carboxylic Anhydrides," J. Org. Chem. May 1967, 32, 1547-1551. They presented evidence that the observed rate acceleration was due to general base catalysis, rather than nucleophilic attack by $F^-$ to generate acetyl fluoride. In 1991 Rinehart and co-workers reported the deacylation of amino acids and peptides containing benzyl and nitrobenzyl ester protecting groups. See Namikoshi, M.; Kundu, B.; Rinehart, K. L., "Use of Tetrabulylammonium Fluoride as a Facile Deprotecting Reagent for 4-Nitrobenzyl,2,2,2-Trichloroethyl, and Phenacyl Esters of Amino Acids, J. Org. Chem. 1991, 56, 5464-5466. They found that TBAF not only catalyzed deacylation, but also provided chemoselectivity, deacylating 4-nitrobenzyl esters selectively in the presence of benzyl esters.

Even further, Ueki and co-workers observed deacylation of phenacyl esters by TBAF and, in the presence of thiols, benzoate esters as well. See Ueki, M., Aoki, H., Katoh, T., "Selective Removal of Phenacyl Ester Group with a TBAF.xH$_2$O-Thiol System from Amino Acid Derivatives Containing Benzyl or 4-Nitrobenzyl Ester," Tet. Lett. 1993, Vol. 34, No. 17, 2783-2786. Although El Seoud and co-workers published a fascinating study that reported the deacylation of cellulose acetate and other cellulose esters catalyzed by tetraallylammonium fluoride in DMSO solvent, see Casarano, R., Nawaz, H., Possidonio, S., da Silva, V. i. C., El Seoud, O. A., "A Convenient Solvent System for Cellulose Dissolution and Derivatization: Mechanistic Aspects of the Acylation of the Biopolymer in Tetraallylammonium Fluoride/Dimethyl Sulfoxide," Carbohydr. Polym., 86 (2011), 1395-1402, these authors did not report the observation of any regioselectivity in this deacylation reaction, and they attributed the deacylation to nucleophilic attack by $F^-$ with acetyl fluoride generation.

Thus, it can be seen that having efficient methods of making highly regioselectively substituted cellulose esters will enable structure-property studies that identify optimal material performance in particular applications, supply the materials to deliver that optimal performance, and facilitate the understanding of analytical characteristics of particular cellulose ester regioisomers that will enable better control of traditional synthesis processes.

SUMMARY OF THE INVENTION

Embodiments of the invention provide simple methods for achieving high regioselectivity in cellulose ester syntheses. Benefits of the invention include that the methods are simplified through the use of common organic solvents and without the need for complex protecting group chemistry. Methods according to specific embodiments of the invention can lead to the efficient production of desired materials with a wide array of applications.

Objects of the invention provide processes for the preparation of regioselectively substituted polysaccharide derivatives (such as esters) or carbohydrate derivatives without any need for protecting group chemistry. Specific embodiments involve treating polysaccharide or carbohydrate esters, such as cellulose esters, with tetraalkylammonium fluorides or hydroxides in organic solvents. Especially preferred is the preparation of regioselectively substituted cellulose ester derivatives by such processes.

Other objects of the invention include processes providing regioselectively substituted materials having superior optical, thermal, solubility, miscibility, colligative, and other properties. As a result of a unique combination of characteristics (including high transparency, resistance to stretch, ability to be cast to very smooth films from solvents, ability to cast into anisotropic films, ability to hydrolyze one face of the film to increase hydrophilicity and adhesion to hydrophilic poly(vinyl alcohol) layer) cellulose triacetate (CTA or TAC), cellulose acetate propionate (CAP), cellulose acetate butyrate (CAB), and cellulose tripropionate (CTP), as well as other cellulose esters, find use as films for the liquid crystal display (LCD) industry. Cellulose ester films can be used as protective and compensation films (waveplates) used with polarizer sheets. Waveplates comprising cellulose acetate are used to obtain an LCD with desired optical properties, such as in improving or adjusting contrast ratio, viewing angle, or color shift performance of the LCD for a desired application. As disclosed in U.S. Patent Publication No. 2012/0003404, entitled "Multilayer Cellulose Ester Film Having Reversed Optical Dispersion," waveplates made from cellulose esters, such as cellulose acetate (CA), cellulose acetate propionate (CAP), and cellulose acetate butyrate (CAB), as compared with other polymers, often have reversed optical dispersions because of their polymer chain conformation and chemical compositions and tend to exhibit normal optical dispersions as a result of their low hydroxyl level.

Optical films of the present invention having low birefringence (a refractive index that depends on the polarization and propagation direction of light) values are highly desired. The maximum difference in refractive index within the material is often used as a measurement of birefringence. Birefringence in cast films results from the orientation of fibers during the casting process. The orientation causes indices of refraction within the plane of the film to be measurably different. The difference in indices of refraction in perpendicular directions within the plane of the film is referred to as in-plane birefringence. In-plane retardation is calculated from the product of the absolute value of birefringence and film thickness. As disclosed in U.S. Pat. No. 7,083,752, entitled "Cellulose Acetate Films Prepared by Coating Methods," optical films comprising in-plane retardation values of less than 10 nm, such as 5 nm or even 1 nm, are preferred. Such films with high transmittance are also highly desired, such as having a transmittance value of 75% or more, such as 80% or more, such as 90% or 95% or 98% or more. Embodiments of the invention include optical films with in-plane retardation values of less than 10 nm, or less than 5 nm, or even less than 1 nm and/or optical films with a high transmittance value of 75% or more, such as 80% or more, such as 90% or 95% or 98% or higher.

Preferred embodiments include regioselectively substituted cellulose esters chosen from any one or more of cellulose acetates, propionates, butyrates, hexanoates, and benzoates, such as more specifically cellulose triacetate (CTA), cellulose acetate (CA), cellulose acetate propionate (CAP), cellulose acetate butyrate (CAB), and the like.

In particular, selectively 6-O-substituted derivatives, as well as such compounds substituted with an acyl group (i.e., alkanoyl group) at O-6 and the same or different acyl group at another hydroxyl position are specifically included within the scope of the invention. Optionally, processes of the invention can involve acylation of the 6-acyl derivatives using an activated acyl, such as an acyl chloride, acyl anhydride, or acyl imidazolide derivative.

In embodiments of the invention, methods comprise the use of the tetraalkylammonium ion in the regioselective TBAF deacylation of carbohydrates or polysaccharides, such as cellulose acetates, and the specific mechanism at C-2/3 and C-6 respectively. The mechanism is believed to involve chelation of the ammonium ion by the acetate's carbonyl oxygens at C-2/3, followed with the ketene-intermediate deacylation mediated by the concentrated fluoride anion at C-2/3, and partial deacylation at C-6 through a general base-catalyzed mechanism.

The regioselectivity and efficiency of the reaction between tetraalkylammonium hydroxides ($R_4$NOH, wherein $R_4$ is any carbon-containing group) and the secondary esters is such that this method has the potential to be used to synthesize cellulose-6-O-esters and cellulose-2,3-A-6-B—O triesters with high regioselectivity, and even to exceed the TBAF in efficiency and economy. The fact that fewer equivalents of $R_4$NOH are needed, and that the $R_4$NOH are simpler to recycle, opens the door for the practical, industrial manufacture of regioselectively substituted cellulose derivatives.

Exemplary embodiments of the invention are described in more detail below. It is understood that within the context of this specification descriptions of methods provided necessarily include within the scope of the invention any of the products prepared, whether or not prepared by the exemplary method provided.

More specific embodiments of the invention provide a method of preparing a regioselectively substituted polysaccharide, oligosaccharide, or carbohydrate ester comprising: providing or synthesizing an ester from a selected carbohydrate or polysaccharide; providing a solvent capable of dissolving the carbohydrate or polysaccharide ester; providing a cation fluoride or cation hydroxide salt capable of selectively deacylating the ester in the solvent; and reacting the ester and cation fluoride or hydroxide in the solvent for a time and under conditions sufficient to obtain a desired regioselectively substituted ester product. Preferably, such methods are performed without using protection/deprotection chemistry techniques.

Such methods include embodiments wherein the regioselectively substituted ester product has a degree of substitution less than the ester from the starting carbohydrate, oligosaccharide, or polysaccharide ester, and wherein the degree of substitution at C-6 is 50% or higher of its total original degree of substitution, i.e., the total DS of the ester before deacylation.

For example, the regioselectively substituted ester product can have a degree of substitution at C-6 that is 80% or higher of its original total degree of substitution. Further, for example, the regioselectively substituted ester product can have a degree of substitution at C-6 that is 90% or higher of its original total degree of substitution, such as a degree of substitution at C-6 that is 95% or higher of its original total degree of substitution.

Methods of the invention can be performed using carbohydrate, oligosaccharide, or polysaccharide material that is comprised of monosaccharide, disaccharide, or trisaccharide repeat units, or linear or branched carbohydrate molecules comprising monosaccharide, disaccharide, or trisaccharide repeating monomer units. Examples of such saccharides include glucose, sucrose, lactose, cellobiose, mannose, amylose, xylose, ribose, galactose, arabinose, fructose, sorbose, cellotriose and raffinose.

According to embodiments, ester products can be prepared from carbohydrate, oligosaccharide, or polysaccharide esters with a weight average molecular weight (MW) ranging from about 162 to 1,000,000. The degree of polymerization of the regioselectively substituted ester product in embodiments can range from 1 to 10,000, such as from 500 to 5,000, or from 1,000 to 3,000.

The regioselectively substituted ester products of embodiments of the invention include one or more esters chosen from cellulose acetates, cellulose propionates, cellulose butyrates, cellulose hexanoates, cellulose stearates, cellulose benzoates, esters of pullulan including pullulan acetate, pullulan propionate, pullulan butyrate, pullulan hexanoate, pullulan stearate, pullulan benzoate; esters of curdlan including curdlan acetate, curdlan propionate, curdlan butyrate, curdlan hexanoate, curdlan stearate, curdlan benzoate; amylose acetate, amylose propionate, amylose butyrate, amylose hexanoate, amylose stearate, amylose benzoate. For example, the regioselectively substituted ester product can be cellulose acetate adipate propionate, cellulose acetate adipate butyrate, cellulose acetate adipate, cellulose adipate, cellulose acetate pimelate propionate, cellulose acetate pimelate butyrate, cellulose acetate pimelate, cellulose pimelate, cellulose acetate suberate propionate, cellulose acetate suberate butyrate, cellulose acetate suberate, cellulose suberate, cellulose acetate azelate propionate, cellulose acetate azelate butyrate, cellulose acetate azelate, cellulose azelate, or combinations thereof. In some preferred embodiments, the regioselectively substituted ester products produced according to the invention can be curdlan, pullulan, dextran, and glucose esters.

Solvents used in methods of the invention can include any solvent that is not reactive with the polysaccharide ester or with the deacylation agent, such as tetraalkylammonium fluoride or hydroxide, and that dissolves an effective amount of both the polysaccharide ester and the tetraalkylammonium fluoride or hydroxide, such as those chosen from one or more of methyl ethyl ketone (MEK), tetrahydrofuran (THF), dimethyl sulfoxide (DMSO), 1,3 dimethyl-2-imidazolidinone (DMI), dimethylacetamide (DMAC), dioxane, dimethylformamide (DMF), ethyl acetate (EtOAc), butyl acetate (BuOAc), trichloromethane ($CHCl_3$), dichloromethane ($CH_2Cl_2$), or combinations thereof.

The deacylation agent can be provided by one or more of tetraalkylammonium fluoride or hydroxide salts; including tetramethylammonium fluoride, tetramethylammonium hydroxide, or tetraethylammonium fluoride, or hydroxide; or tetrabutylammonium fluoride or hydroxide; or tetraoctylammonium fluoride or hydroxide; or an alkali metal fluoride or hydroxide. Preferably, the cation is provided by one or more of tetramethyl, tetraethyl, or tetrabutyl ammonium fluoride or hydroxide.

Methods of the invention can be used to prepare regioselectively substituted ester products comprising the following anhydroglucose repeating unit:

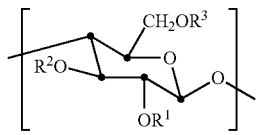

wherein $R^1$, $R^2$, and $R^3$ are each independently chosen from a hydrogen atom, and, whether substituted or unsubstituted, branched or unbranched, an alkanoyl group, an aroyl group, and a heteroaroyl group comprising from 1-20 carbon atoms. In embodiments, ester products comprising pullulan, curdlan, or amylose repeat units comprising these $R^1$, $R^2$, and $R^3$ substituents may also be prepared.

In preferred embodiments, the solvent is THF or DMSO.

In preferred embodiments, the cation is provided by TBAF or TBAOH.

In preferred embodiments, the ester product is a cellulose acetate.

Included in the scope of embodiments of the invention are regioselectively substituted carbohydrate or polysaccharide esters comprising the following anhydroglucose repeating units:

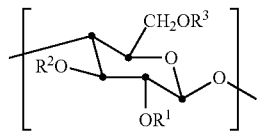

wherein $R^1$, $R^2$, and $R^3$ are each independently chosen from a hydrogen atom, and, whether substituted or unsubstituted, branched or unbranched, an alkanoyl group, an aroyl group, and a heteroaroyl group comprising from 1-20 carbon atoms; and wherein the regioselectively substituted carbohydrate or polysaccharide ester is prepared by deacylation of an ester starting material, has a total degree of substitution at its C-2, C-3, or C-6 positions combined ($DS_{TOT}$) that is less than that of the ester starting material, and has at least some degree of substitution at C-6.

Such regioselectively substituted carbohydrate or polysaccharide esters can have a degree of substitution at C-6 that is equal to or up to about 50% less than that of the ester starting material, such as that is equal to or up to about 30% less than that of the ester starting material, or that is equal to or up to about 10% less than that of the ester starting material.

Preferable regioselectively substituted carbohydrate or polysaccharide esters include those wherein the alkanoyl groups are chosen from branched or unbranched, substituted or unsubstituted, $C_{1-4}$ alkanoyl, $C_{2-6}$ alkanoyl, $C_{3-8}$ alkanoyl, $C_{5-10}$ alkanoyl, $C_{7-15}$ alkanoyl, $C_{9-18}$ alkanoyl, $C_{11-19}$ alkanoyl, $C_{12-17}$ alkanoyl, and $C_{13-16}$ alkanoyl groups.

In embodiments, the aroyl or heteroaroyl group is chosen from branched or unbranched, substituted or unsubstituted, $C_{1-4}$ heteroaroyl or aroyl, $C_{2-6}$ heteroaroyl or aroyl, $C_{3-8}$ heteroaroyl or aroyl, $C_{5-10}$ heteroaroyl or aroyl, $C_{7-15}$ heteroaroyl or aroyl, $C_{9-18}$ heteroaroyl or aroyl, $C_{11-19}$ heteroaroyl or aroyl, $C_{12-17}$ heteroaroyl or aroyl, and $C_{13-16}$ heteroaroyl or aroyl groups. The aroyl or heteroaroyl group can comprise at least one heteroatom chosen from phosphorus, sulfur, oxygen, nitrogen, chlorine, bromine, and iodine.

The aroyl or heteroaroyl group can be a 3-, 4-, 5-, 6-, 7-, 8-, 9-, 10-, 11-, 12-, 13-, 14-, 15-, 16-, 17-, 18-, 19-, or 20-membered ring, unsubstituted or substituted with one or more group chosen from methyl, ethyl, propyl, or butyl groups, or any $C_{1-20}$ substituent, or a halide.

$R^1$, $R^2$, and $R^3$ can also be independently chosen such that the ester product is adipate, suberate, sebacate, succinate, or glutarate.

Also included in the invention is an optical film comprising a regioselectively substituted cellulose ester comprising the following anhydroglucose repeating units:

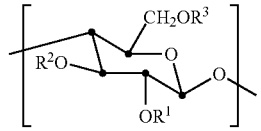

wherein $R^1$, $R^2$, and $R^3$ are each independently chosen from a hydrogen atom, and, whether substituted or unsubstituted, branched or unbranched, an alkanoyl group, an aroyl group, and a heteroaroyl group comprising from 1-20 carbon atoms; and wherein the regioselectively substituted cellulose ester is prepared by deacylation of an ester starting material, has a total degree of substitution at its C-2, C-3, or C-6 positions combined ($DS_{TOT}$) that is less than that of the ester starting material, and has at least some degree of substitution at C-6.

The optical film can have alkanoyl groups chosen from branched or unbranched, substituted or unsubstituted, $C_{1-4}$ alkanoyl, $C_{2-6}$ alkanoyl, $C_{3-8}$ alkanoyl, $C_{5-10}$ alkanoyl, $C_{7-15}$ alkanoyl, $C_{9-18}$ alkanoyl, $C_{11-19}$ alkanoyl, $C_{12-17}$ alkanoyl, and $C_{13-16}$ alkanoyl groups.

The aroyl or heteroaroyl group of the regioselectively substituted cellulose ester of the optical film can be chosen from branched or unbranched, substituted or unsubstituted, $C_{1-4}$ heteroaroyl or aroyl, $C_{2-6}$ heteroaroyl or aroyl, $C_{3-8}$ heteroaroyl or aroyl, $C_{5-10}$ heteroaroyl or aroyl, $C_{7-15}$ heteroaroyl or aroyl, $C_{9-18}$ heteroaroyl or aroyl, $C_{11-19}$ heteroaroyl or aroyl, $C_{12-17}$ heteroaroyl or aroyl, and $C_{13-16}$ heteroaroyl or aroyl groups. For example, the optical film can comprise an ester wherein the aroyl or heteroaroyl group comprises at least one heteroatom chosen from phosphorus, sulfur, oxygen, nitrogen, chlorine, bromine, and iodine. Further, for example, the optical film can comprise an ester wherein the aroyl or heteroaroyl group is a 3-, 4-, 5-, 6-, 7-, 8-, 9-, 10-, 11-, 12-, 13-, 14-, 15-, 16-, 17-, 18-, 19-, or 20-membered ring, unsubstituted or substituted with one or more group chosen from methyl, ethyl, propyl, or butyl groups, or any $C_{1-20}$ substituent, or a halide.

In preferred embodiments, the optical film comprises cellulose acetate, cellulose acetate propionate, or cellulose acetate butyrate as the regioselectively substituted cellulose ester. Preferred embodiments also provide a cellulose acetate film wherein the cellulose acetate has a degree of substitution at C-6 equal to or up to about 20% less than that of the ester starting material. Especially preferred are cellulose acetate films comprising an in-plane retardation of less than about 10 nm.

BRIEF DESCRIPTION OF THE DRAWINGS

The accompanying drawings illustrate certain aspects of some of the embodiments of the present invention, and should not be used to limit or define the invention. Together with the written description, the drawings serve to explain certain principles of embodiments of the invention.

DETAILED DESCRIPTION OF VARIOUS EMBODIMENTS OF THE INVENTION

Figure 1:
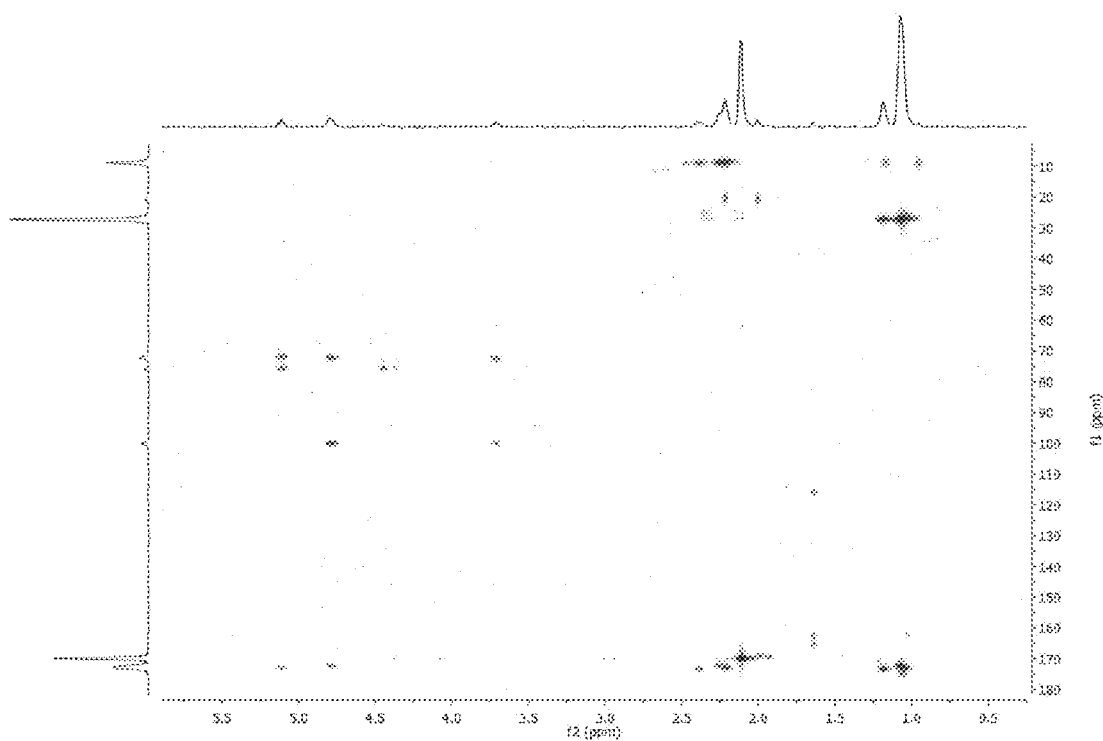
FIG. 1 is a graph of the HMBC spectrum of cellulose acetate product having a degree of substitution (DS) of 0.88.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

The synthesis of cellulose-2,6-A-3-B—O triesters (in other words, esters of cellulose in which one ester type is attached at O-3 (type A, for example acetate), and a second type is attached at the O-2 and O-6 positions (type B, for example propionate)) with a high degree of regioselectivity has been demonstrated using protection of cellulose at both 2- and 6-OH groups using bulky silyl ethers. See Xu, D., Voiges, K., Elder, T., Mischnick, P., Edgar, K. J. Biomacromolecules 2012, 13, 2195. While quite valuable for determining the regiochemical structure-property relationships, such methods are limited in scope. One disadvantage is the number of steps involved in such protection/deprotection schemes, which tends to significantly reduce the overall yield and increase the expense, making the process unattractive for industrial applications.

Alternatively, the inventors have discovered a simple process optionally involving no protection/deprotection steps for the preparation of cellulose-6-O-esters and cellulose-2,3-A-6-B—O triesters with high regioselectivity by using TBAF in DMSO or tetrahydrofuran (THF). See Daiqiang Xu and Kevin J. Edgar, "TBAF and Cellulose Esters: Unexpected Deacylation with Unexpected Regioselectivity," Biomacromolecules 2012, 13, 299-303, published Jan. 10, 2012.

TBAF mediated deacylation of cellulose and its derivatives shows unexpected selectivity for removal of the more hindered secondary ester groups at C-2 and C-3. In embodiments of the invention regioselectivity refers to the targeted removal of substituents on the oxygen atom disposed at any one or more of the C-2 and C-3 positions. Where the starting material comprises, e.g., ester groups at the C-2, C-3, or C-6 positions, deacylation can be performed to instead obtain a hydroxyl group at any one or more of C-2 or C-3.

In preferred embodiments, selective deacylation is targeted to be performed only at the C-2 and C-3 positions. Selective deacylation can also include some deacylation at the C-6 position. For example, in embodiments the total degree of substitution ($DS_{TOT}$) of the starting material can be reduced and the resultant material can have a degree of substitution at the C-6 position ($DS_6$), relative to the total degree of substitution of the resultant material, of 50% or higher, such as 60% or higher, such as 70% or higher, or 75% or higher, or 80% or higher, or 85% or higher, or 90% or higher, or 95% or higher, or 98% or higher, or 100%. Expressed another way, the degree of substitution at C-6 can be equal to or up to about 50% less than that of the ester starting material, such as about 40% less, or about 30% less, or about 25% less, or about 20% less, or about 15% less, or about 10% less, or about 5% less, or about 2% less.

In particular, the reaction of commercially available cellulose acetate with a degree of substitution (DS) of 2.42 using TBAF in THF at 50° C. within 24 hours, for example, provides cellulose acetate with a degree of substitution (DS) (Ac) at C-6 of 0.80, while the total residual DS at secondary alcohols (C-2 and C-3) is only 0.10. This regioselective deacylation reaction is very surprising and without literature precedent.

Methods of the present invention additionally provide for the regioselective deacylation of other carbohydrate esters and polysaccharide esters. The term carbohydrate as used in this specification is understood to refer to monosaccharides, disaccharides, trisaccharides, or oligosaccharides (degree of polymerization (DP) up to 10 monosaccharides) where the saccharide is in the form of a pyranose (6-member ring) or furanose (5-member rings). Polysaccharides in the context of the invention are linear or branched carbohydrate molecules comprising repeating monomer units which are joined together by glycosidic bonds. The carbohydrate monomer units of the polysaccharides can comprise as the repeating unit a monosaccharide, disaccharide, or trisaccharide. When referring to carbohydrates and polysaccharides in this specification these terms may in some cases encompass derivatives of these compounds. A broad range of carbohydrate and polysaccharide derivatives, such as esters and ethers, can be used to prepare various regioselectively substituted esters of embodiments of the invention.

Like simple alcohols, the hydroxyl groups of carbohydrates and polysaccharides, such as cellulose, can be esterified by reaction with acids or other acylating agents. In preparing ester starting materials, non-limiting examples of carbohydrates that can be used include glucose, sucrose, lactose, cellobiose, mannose, amylose, xylose, ribose, galactose, arabinose, fructose, sorbose, cellotriose and raffinose and the like. Where examples are provided in this specification of a particular type of carbohydrate or carbohydrate derivative, such as an ether or ester, in combination with a particular substituent, it is understood that the same substituents used in the examples can be used on another type of carbohydrate or derivative. For example, it is understood that examples illustrating the use of cellulose acetate may also be applicable to examples using amylose acetate, mannose acetate, or mannose pentaacetate. Likewise, examples showing applicability of certain catalysts to cellulose acetate may also be applicable to examples using cellulose butyrate or amylase propionate.

Of particular interest under embodiments of the invention are cellulose esters. According to embodiments, included are cellulose triesters or partially substituted cellulose esters. Examples of cellulose triesters include cellulose triacetate, cellulose tripropionate and cellulose tributyrate. Examples of partially substituted cellulose esters include cellulose acetate, cellulose acetate propionate and cellulose acetate butyrate. Such cellulose esters are described in U.S. Pat. Nos. 1,698,049, 1,683,347, 1,880,808, 1,880,560, 1,984,147, 2,129,052 and 3,617,201, the disclosures of which are hereby incorporated by reference herein in their entireties.

The chain length or degree of polymerization (DP) can have an effect on the properties of oligosaccharide and polysaccharide derivatives. In the context of the specification, the degree of polymerization is the number of anhydroglucose units in the polymer molecule. Regioselectively substituted oligosaccharide or polysaccharide derivatives of embodiments of the present invention include polymers comprising from 2 (e.g., cellobiose) to about 10,000 anhydroglucose repeating units (AGU). Preferred esters of embodiments of the invention, such as cellulose esters, comprise from 5 to 10,000 AHG repeating units, such as from 10 to 8,000, or from 15 to 7,000, or from 20 to 6,000, or from 25 to 4,000, or from 30 to 3,000, or from 50 to 1,000, or from 75 to 500, or from 80 to 650, or from 95 to 1,200, or from 250 to 2,000, or from 350 to 2,700, or from 400 to 2,200, or from 90 to 300, or from 100 to 200, or from 40 to 450, or from 35 to 750, or from 60 to 1,500, or from 70 to 2,500, or from 110 to 3,500, or from 150 to 2,700, or from 2,800 to 5,000, and so on.

The anhydroglucose unit is the fundamental chemical repeating structure of cellulose and has three hydroxyl groups located in the 2, 3, and 6 positions. According to embodiments of the invention, the hydroxyl groups are reacted, e.g., by acetylation, to form acetate esters. Cellulose diacetate, which has acetate groups on approximately an average of 2.5 of the three hydroxyls of the AGU, is one of the most common forms of cellulose acetate, including the cellulose acetate most widely used in plastic, film, fiber, and drug delivery applications. Characterized as a partially substituted cellulose acetate, cellulose diacetate is also commonly referred to as acetate.

The manner in which hydroxyl groups of the carbohydrate starting material are replaced can be described by the degree of substitution (DS or $DS_{OH}$). The term "degree of substitution" can refer to the average total number of acyl (alkanoyl) substituents per anhydroglucose ring of the cellulose molecule, or said another way can refer to the average number of hydroxyl positions on the anhydroglucose unit of the carbohydrate that have been reacted. Since each anhydroglucose unit has three hydroxyl groups, the maximum value for $DS_{OH}$ is three. According to embodiments of the invention, starting esters can have a degree of substitution ranging anywhere from 1-3.

Cellulose contains three different kinds of anhydroglucose units, the reducing end with a free hemi-acetal (or aldehyde) group at C-1, the non-reducing end with a free hydroxyl at C-4, and the internal rings joined at C-1 and C-4. Cellulose reactions are usually controlled more by steric factors than would be expected on the basis of the inherent reactivity of the different hydroxyl groups. Generally speaking, partial reaction to compounds having a DS of less than 3 usually results in products that are essentially block copolymers, where virtually all of the hydroxyls occurring in the less ordered regions may be derivatized (i.e., substituted), while those in the crystalline regions remain unreacted. Higher degrees of substitution, or reaction conditions which disrupt the crystalline regions, can be used to reduce inter-chain hydrogen bonding and force the chains apart, which can result in a cellulose derivative that is soluble in common solvents, and thus capable of extrusion to form filaments, or other structures. Thus, there are apparent advantages, including producing materials with desired solubility characteristics, in being able to control the degree of substitution and location of substitution by using regioselective substitution according to embodiments of the invention.

Although amylose and cellulose are linear polymers of glucose linked with 1,4-bonds, the anomeric configurations of the two are different. In particular, the glucose units of amylaose are linked with $\alpha\text{-}(1\rightarrow 4)$ glycosidic bonds, whereas the monomeric units of cellulose are linked by $\beta(1\rightarrow 4)$ glycosidic bonds. Because of this difference in bonding, amylose is helical in structure as compared with the straight polymer chains of cellulose. Additionally, the acetal linkages between the C-1 and C-4 of adjacent pyranose rings in cellulose provides for differences in spatial arrangement (i.e., stereochemistry). All non-hydrogen substituents disposed on the pyranose rings of the cellulose molecule are disposed in an equatorial position, as opposed to axial, and protrude out from the periphery of the rings. Thus, two different stereochemistries are possible at C-1, where the C-4 hydroxyl can approach the C-1 carbonyl from either side. The $\alpha$ configuration is the result of the C-1 hydroxyl being disposed axially. For cellulose, however, the C-1 oxygen is in equatorial or 13 configuration.

Preferably, the starting esters used according to the method embodiments of the invention have a degree of substitution (DS) ranging from about 1 to 3.0, or from about 1.1 to 2.8, or from about 1.2 to 2.7, or from about 1.3 to 2.6, or from about 1.4 to 2.5, or from about 1.5 to 2.4, or from about 1.6 to 2.3 or from about 1.7 to 2.2, or from about 1.8 to 2.1, or from about 1.9 to 2. For example, the starting esters can have a DS falling in the range of about 2 up to 3, such as from about 2.4 up to 2.6, or from about 2.2 up to 2.5, or from about 2.3 up to 2.4.

In particular embodiments, for example, the DS of the esters, such as cellulose esters, can range from about 0.7 to about 3.0. More particularly, the DS may be from about 1.7 to about 2.8, or from about 1.9 to about 2.6. Further, for example, the DS of the ester can be from about 0.7, 0.9, 1.0, 1.2, 1.4, 1.6, 1.8, 2.0, 2.2, 2.4, 2.6, 2.8 or 3.0, where any value may be used as an upper or a lower endpoint, as appropriate.

Carbohydrate, oligosaccharide, and polysaccharide esters, such as cellulose esters, useful in the present invention generally have a weight average molecular weight (MW) ranging from about 162 to about 400,000 as measured by GPC with polystyrene equivalents, mass spectrometry, or other appropriate methods. For example, esters according to the invention can be prepared having a MW of from about 100,000 to about 300,000, such as from about 125,000 to about 250,000, or about 100,000, 125,000, 150,000, 175,000, 200,000, 225,000, 250,000, 275,000 or 300,000, where any value may be used as an upper or a lower endpoint, as appropriate. Examples of carbohydrate esters that can be used in the invention include any disclosed in U.S. Pat. Nos. 5,124,446; 8,273,872; and 7,276,546.

In embodiments, the particular MW and DS for a target regioselectively substituted ester will generally depend upon the particular application in which the carbohydrate or polysaccharide derivative is used. Further, the DS of each acyl substituent can affect one or more properties, such as optical or thermal properties for example, and the substituents can be selected to achieve a particular result.

Resultant esters prepared by methods of the invention can have any degree of substitution with respect to the O-6 position ($DS_6$). In preferred embodiments, compounds of the invention can have a resultant $DS_6$ ranging from about 0.2 to 1.0, such as from about 0.3 to 0.9, or from about 0.4 to 0.8, or from about 0.5 to 0.7, or from about 0.7 to 1.0, or from about 0.8 to 0.9, such as from about 0.4 to 0.8, or from about 0.6 to 0.9, or from about 0.5 to 0.6, and so on.

Molar substitution is defined as the average number of molecules, such as ethylene oxide, that have reacted with each anhydroglucose unit. Once an epoxide has reacted with a polysaccharide hydroxyl to form a hydroxyalkyl substituent group (for example, reaction with ethylene oxide to form a hydroxyalkyl or oxyalkyl (anionic) substituent), the oxyalkyl or hydroxyalkyl substituent can further react with additional epoxides in an end-to-end formation. As long as molecules of the substituent group are available, this reaction can theoretically continue without limit. Such esters and ester products are included within the invention.

The hydroxyl groups of the carbohydrate esters, polysaccharide esters, and their derivatives as starting materials can be partially or fully reacted with other moieties to prepare regioselective deacylation substrates having both carboxylic acid ester groups and potentially other substituents on one or more of the hydroxyl positions. Preferred starting materials can include cellulose esters and cellulose ethers. Any carbohydrate ester, polysaccharide ester, or derivative thereof can be used as starting material for the regioselective substitution methods of the invention. Indeed, any cellulose derivative can be used, such as cellulose derivatives comprising from 1-20 carbon atoms. Preferred cellulose esters for use in the present invention are $C_{1-6}$ esters, including for example cellulose acetate, cellulose propionate, cellulose butyrate, cellulose acetate propionate, and cellulose acetate butyrate, cellulose nitrate, and cellulose sulfate, to name a few. When referring to cellulose acetate in the context of this specification, this may also include cellulose triacetate or cellulose diacetate. With respect to the starting materials, any one or more of the C-2, C-3, or C-6 can comprise a hydroxyl group, an ester group or an ether group.

The specific cellulosic material can include, but is not limited to, cellulose, methylcellulose, hydroxyethyl methylcellulose, ethylcellulose, carboxymethylcellulose, hydroxyethyl cellulose, hydroxypropyl methylcellulose, cellulose acetate butyrate, cellulose acetate propionate, cellulose acetate, carboxymethylcellulose acetate butyrate, carboxymethylcellulose, cellulose hexanoate, cellulose propionate, cellulose butyrate, cellulose octanoate, cellulose nonanoate, cellulose stearate, cellulose palmitate, cellulose isobutyate, cellulose benzoate, cellulose pivalate, methyl cellulose, ethyl cellulose, or combinations thereof.

In some embodiments, the esters are cellulose acetate adipate propionate, cellulose acetate adipate butyrate, cellulose acetate adipate, cellulose adipate, cellulose acetate pimelate propionate, cellulose acetate pimelate butyrate, cellulose acetate pimelate, cellulose pimelate, cellulose acetate suberate propionate, cellulose acetate suberate butyrate, cellulose acetate suberate, cellulose suberate, cellulose acetate azelate propionate, cellulose acetate azelate butyrate, cellulose acetate azelate, cellulose azelate, or combinations thereof. In the context of this specification, when referring to an ester, this term is intended to include any starting material or resultant ester product.

Regioselectively substituted cellulose esters of embodiments of the invention can comprise the following anhydroglucose repeating units:

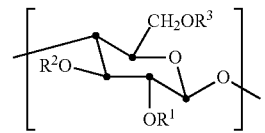

wherein $R^1$, $R^2$, and $R^3$ are each independently chosen from a hydrogen atom, and, whether substituted or unsubstituted, branched or unbranched, an alkanoyl group, an aroyl group, and a heteroaroyl group. In embodiments, the alkanoyl, aroyl and heteroaroyl groups can comprise from 1-20 carbon atoms.

For example, the alkanoyl groups can be chosen from $C_{1-4}$ alkanoyl groups such as branched or unbranched, substituted or unsubstituted, methanoyl, ethanoyl, propanoyl, and butanoyl; or for example chosen from $C_{2-6}$ alkanoyl, or $C_{3-8}$ alkanoyl, or $C_{5-10}$ alkanoyl, or $C_{7-15}$ alkanoyl, or $C_{9-18}$ alkanoyl, or $C_{11-19}$ alkanoyl, or $C_{12-17}$ alkanoyl, or $C_{13-16}$ alkanoyl, whether branched or unbranched, substituted or unsubstituted.

The aroyl or heteroaroyl group can for example be chosen from, whether branched or unbranched, substituted or unsubstituted, $C_{1-4}$ heteroaroyl or aroyl, $C_{2-6}$ heteroaroyl or aroyl, or $C_{3-8}$ heteroaroyl or aroyl, or $C_{5-10}$ heteroaroyl or aroyl, or $C_{7-15}$ heteroaroyl or aroyl, or $C_{9-18}$ heteroaroyl or aroyl, or $C_{11-19}$ heteroaroyl or aroyl, or $C_{12-17}$ heteroaroyl or aroyl, or $C_{13-16}$ heteroaroyl or aroyl. With respect to the heteroaroyl groups, any one or more heteroatom can be chosen from phosphorus, sulfur, oxygen, nitrogen, chlorine, bromine, or iodine. The heteroaroyl groups can comprise any number and combination of heteroatoms, with from 1-3 heteroatoms being preferred. For example, heteroaroyl groups comprising two oxygen atoms, or two nitrogen atoms, or two sulfur atoms, or one nitrogen and two sulfur atoms, or one nitrogen and one oxygen atom, or one nitrogen and one sulfur atoms, etc., are included within the scope of the invention. Further, for example, heteroaroyl groups comprising at least one nitrogen atom and at least one oxygen atom are also included. The heteroaroyl or aroyl groups can comprise any number of atoms in a 3-, 4-, 5-, 6-, 7-, 8-, 9-, 10-, 11-, 12-, 13-, 14-, 15-, 16-, 17-, 18-, 19-, or 20-membered ring, with heteroaroyl and aroyl groups preferably comprising one or more 3-, 4-, 5-, 6-, 7-, or 8-membered ring, such as 2 or 3 such rings, such as 2, 5- or 6-membered rings. Any number and type of substituents can be disposed on the ring of the heteroaroyl or aroyl group, such as one or more methyl, ethyl, propyl, or butyl groups, or any $C_{1-20}$ substituent, or a halide, including bromine, iodine, chlorine, fluorine, and so on.

The regioselectively substituted carbohydrate esters of preferred embodiments of the invention may comprise an AGU (e.g., ester-based repeating group) with linkages that can be alpha or beta, and which can additionally be 1→4 (amylose, cellulose), 1→3 (curdlan), or 1→6 linkages (pullulan (which also contains 1→4 linkages)).

According to embodiments, regioselectively substituted carbohydrate and polysaccharide esters and ether esters can be prepared using regioselective deacylation methods of the invention. It has been found that 3-allyl-2-thexyldimethylsilylcellulose-6-O-acetate (1) can be prepared by using such methods, as illustrated in Scheme 1:

Scheme 1. TBAF-catalyzed deacylation of 3-allyl-2-thexyldimethylsilylcellulose acetate.

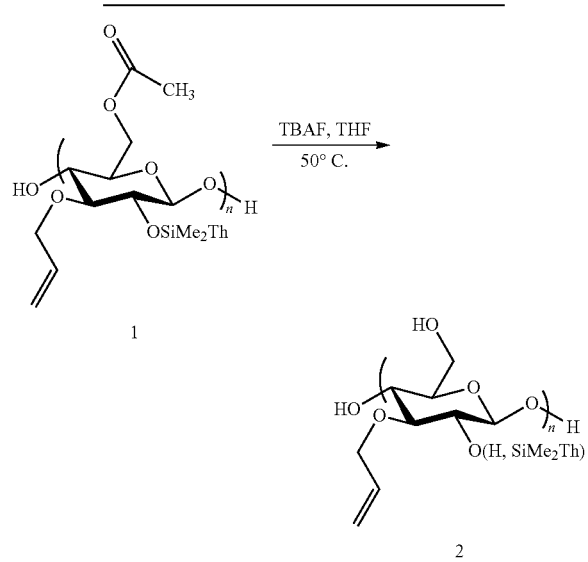

Using TBAF (tetra(n-butyl)ammonium fluoride) in THF, it was a surprise to observe complete cleavage of the acetate group (along with only partial cleavage of the silyl ether). See Koschella, A.; Klemm, D., Macromol. Symp. 1997, 120, 115. The generality of this method was then tested, choosing as substrate a commercial cellulose acetate (CA) of DS 2.42 (CA-398-30, Eastman Chemical Co.) because of its good solubility in THF. Treatment of this DS 2.42 CA with TBAF in THF at 50° C. (Scheme 2) provided a fascinating result.

Scheme 2. Deacylation of Cellulose Acetate by TBAF in THF.

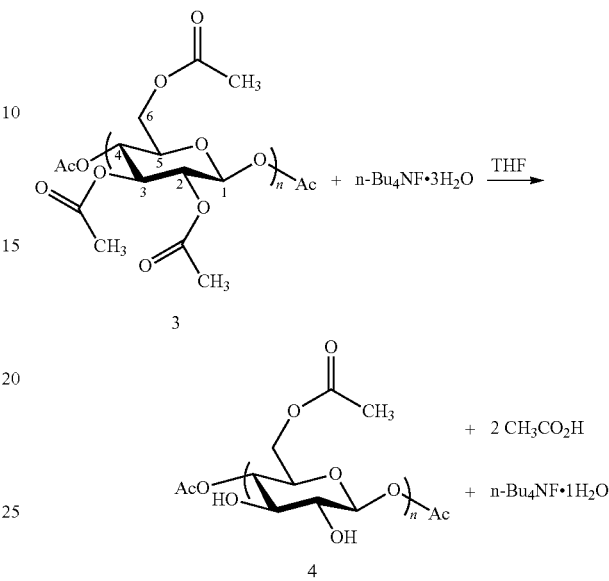

Substantial but not complete deacylation was observed, with the DS acetate reduced from 2.42 to 0.92 after 24 h. Upon careful examination of the product, in particular by $^1$H and $^{13}$C NMR of its perpropionylated derivative (to maximize solubility for NMR and to simplify the spectra to facilitate analysis), it became clear that not only had deacylation occurred with CA as well, but it had occurred in highly regioselective fashion. There was only one strong resonance for the acetyl methyl group in the proton NMR spectrum, and likewise only one strong acetyl carbonyl in the $^{13}$C NMR spectrum. The chemical shifts corresponded to those of cellulose-6-O-acetate, in accord with the work of Heinze and the assignments of cellulose acetate monosaccharide resonances by Buchanan and co-workers. See Liebert, T.; Hussain, M. A.; Heinze, T. Macromol. Symp. 2005, 223, 79, see Buchanan, C. M.; Edgar, K. J.; Hyatt, J. A.; Wilson, A. K. Macromolecules 1991, 24, 3050, and see Buchanan, C. M.; Edgar, K. J.; Wilson, A. K. Macromolecules 1991, 24, 3060.

As further confirmation, a heteronuclear multibond correlation NMR experiment (HMBC) was carried out. In the past it has been observed that the cross peaks between ester carbonyls and the nearest ring hydrogen of the anhydroglucose (3-bond correlation) are not always strong enough to be observed, but when observed they are diagnostic of the position of substitution. See Granstrom, M.; Kavakka, J.; King, A.; Majoinen, J.; Makela, V.; Helaja, J.; Hietala, S.; Virtanen, T.; Maunu, S.-L.; Argyropoulos, D.; Kilpelainen, I. Cellulose 2008, 15, 481. In the case of the DS 0.88 CA product, the HMBC spectrum showed two clear correlation peaks between the two diastereotopic 6-H resonances at 4.37 and 4.08 ppm, and the acetate carbonyl $^{13}$C resonance at 170 ppm, as shown in FIG. 1.

Deacylation by TBAF was not anticipated, thus, this was a stunning result. Even so, accepting the occurrence of deacylation, there was no reason to expect that it would be regioselective. Further, should regioselectivity be observed, the literature would lead one to expect selectivity for deacylation at the less sterically hindered O-6 acetate group, not at the more hindered secondary O-2 and O-3 acetates.

The deacetylation reaction preferably takes place at atmospheric pressure and at a temperature ranging from about 35° C. to about 100° C. Depending on the catalyst used, more restrictive temperature limitations may be in order. For example, when using TBAF, which has limited thermal stability, temperatures lower than about 70° C. are typically used to avoid TBAF decomposition. Temperatures ranging for example from about 40° C. to about 55° C., or from about 45° C. to about 60° C., or from about 50° C. to about 65° C. may also be used. Generally, it is preferred that the temperature be maintained as low as possible, to minimize side reactions and to keep costs at a minimum (especially for a large scale process). Optionally, the deacylation reaction can take place under nitrogen.

Cations acceptable for enabling regioselective substitution of the carbohydrate and polysaccharide derivatives can include any cation, or compound capable of providing a cation, described in this specification. Of particular interest are tetraoctyl ammonium, tetrabutyl ammonium, tetramethyl ammonium, and tetraethyl ammonium. The corresponding anion can be either fluoride or hydroxide, thus deacylating agents can include tetramethylammonium fluoride or hydroxide; or tetraethylammonium fluoride or hydroxide; tetrabutylammonium fluoride or hydroxide, tetraoctylammonium fluoride or hydroxide, or combinations thereof. Alkali metal salts, such as those comprising potassium or sodium, including sodium hydroxide, potassium hydroxide, calcium hydroxide, magnesium hydroxide, or potassium fluoride, can also be used in embodiments. It is noted that in some cases certain cation/solvent/ester combinations may under certain circumstances achieve better results than others. Exposure of cellulose acetate (DS 2.42) to the chloride and iodide salts of TBA in THF gave no deacylation. While a small amount (such as 1 molar equivalent/AGU) of TBAOH gives selective deacylation under appropriate conditions, higher concentrations of TBAOH may lead to complete, non-selective deacylation.

An exemplary method for the regioselective deacylation of carbohydrates, polysaccharides, and/or their derivatives can include hydrolyzing the carbohydrate, polysaccharide or derivative in THF. The method that follows illustrates the hydrolysis of cellulose diacetate in THF. Generally, cellulose diacetate (e.g., DS 2.42, Eastman Chemical Company, 0.50 g, 1.9 mmol AGU) can be dissolved in 20 mL THF. TBAF trihydrate (2.39 g, 4 mol/mol AGU) is then added to the solution. The mixture is allowed to react at 50° C. for 24 h and then precipitated in water (150 mL). The crude product is washed with water several times and dried under vacuum at 40° C. to yield product (4) (see Scheme 2 above). A small sample of the product can then be perpropionylated to facilitate its analysis. The cellulose acetate (4) (0.3 g) is dissolved in a mixture of 5 mL pyridine, 20 mg 4-(dimethylamino)pyridine and 5 mL propionic anhydride. After stifling for 24 h at 80° C., the product is precipitated by adding water (100 mL), then washed several times with water. The crude product is collected by filtration and re-dissolved in 5 mL chloroform. This solution is added slowly with rapid stirring to 300 mL ethanol to precipitate the product. After filtration and washing with excess ethanol several times, the sample can be dried under vacuum at 40° C. to yield the perpropionylated product for analysis.

Any solvent that can dissolve or partially dissolve the starting carbohydrate ester or polysaccharide ester material and the deacylating reagent, and that is inert during the reaction, is appropriate for the present invention. Preferred solvents include methyl ethyl ketone (MEK), tetrahydrofuran (THF), dimethyl sulfoxide (DMSO), 1,3 dimethyl-2-imidazolidinone (DMI), dimethylacetamide (DMAC), dioxane, dimethylformamide (DMF), ethyl acetate (EtOAc), butyl acetate (BuOAc), trichloromethane ($CHCl_3$), dichloromethane ($CH_2Cl_2$), or combinations.

Methods of the invention are applicable to a wide variety of carbohydrate and polysaccharide ester derivatives. Indeed, there is great flexibility in the types of other substituents that can be used to obtain the desired regioselectively substituted products. Aspects of the invention focus on esters and in particular cellulose esters for their usefulness in imparting desired optical characteristics to LCDs. Any ester disclosed in this specification can be used as starting material to obtain a desired regioselectively substituted product. Preferred are esters, such as cellulose acetates, cellulose propionates, cellulose butyrates, cellulose hexanoates, and cellulose benzoates to name a few, which can be used as the starting material or can be the resultant ester product. Any combination of ester, solvent, and cation can be used to obtain a particular target regioselectively substituted product.

Additional reactions were also performed to further illuminate the nature of this unexpected deacylation. Some of these results are reported in Table 1:

TABLE 1

Results of TBAF-catalyzed deacylation of cellulose acetate

| Entry | TBAF (mol/AHG) | Time (h) | $DS_{tot}$ | $DS_6$ | $DS_{2,3}$ |
|---|---|---|---|---|---|
| 1 | 0 | 24 | 2.42 | 0.82 | 1.60 |
| 2 | 0.008 | 24 | 2.42 | 0.82 | 1.60 |
| 3 | 1.0 | 24 | 1.56 | 0.82 | 0.74 |
| 4 | 2.0 | 24 | 1.27 | 0.82 | 0.45 |
| 5 | 3.0 | 24 | 1.06 | 0.82 | 0.24 |
| 6 | 4.0 | 24 | 0.92 | 0.82 | 0.10 |
| 7 | 4.0 | 48 | 0.88 | 0.79 | 0.09 |
| 8 | 4.0 | 72 | 0.84 | 0.76 | 0.08 |
| 9 | 5.0 | 24 | 0.63 | 0.61 | 0.02 |
| 10 | 6.0 | 24 | 0.59 | 0.59 | 0.00 |

AHG = anhydroglucose unit
Degree of substitution (DS) of starting cellulose acetate (CA) = 2.42
Reaction temperature 50° C.

Catalytic TBAF, Entry 1 of Table 1, afforded essentially no deacylation, while Entries 3-6, 8, 9 show that approximately 4 equiv TBAF/AGU was the ideal amount for near complete deacylation at O-2 and O-3 with preservation of the O-6 acetyl. Higher molar ratios and longer reaction times did lead to partial deacylation at O-6. For the molar ratios disclosed in Table 1, the results suggest a mechanism beyond simple deprotonation of the water of hydration by $F^-$ followed by $OH^-$ mediated ester hydrolysis may be involved.

Reaction with TBA hydroxide (TBAOH, or tetra(n-butyl) ammonium hydroxide) using 4 equivalents TBAOH/AGU in THF (tetrahydrofuran) gave non-selective, complete deacylation of cellulose acetate. As illustrated in more detail below, however, use of TBAOH in a lower molar ratio can achieve the target selective deacylation desired. For example, using 1 equivalent TBAOH/AGU, regioselectivity is competitive to that with TBAF. Advantages to using TBAOH include that less reagent can be used and TBAOH is easily recycled (e.g., using simple ion exchange), which are both positives to establishing commercial regioselective processes using TBAOH.

It was of interest to determine whether this reaction could be extended to cellulose triesters, such as cellulose triacetate (CTA) and cellulose tripropionate (CTP). See Heinze, T.;

Liebert, T. F.; Pfeiffer, K. S.; Hussain, M. A. Cellulose 2003, 10, 283, and see Regiani, A. M.; Frollini, E.; Marson, G. A.; Arantes, G. M.; El Seoud, O. A., J. Polym. Sci., Part A: Polym. Chem. 1999, 37, 1357. These results are reported in Table 2:

TABLE 2

TBAF-catalyzed deacylation of cellulose triesters

| Entry | Ester | TBAF (mol/AHG) | Solvent | $DS_{tot}$ | $DS_6$ | $DS_{2,3}$ |
|---|---|---|---|---|---|---|
| 1 | CTA | 4.0 | DMSO | 1.37 | 0.77 | 0.60 |
| 2 | CTA | 4.0 | THF | 1.41 | 0.78 | 0.63 |
| 3 | CTP | 4.0 | DMSO | 1.07 | 0.91 | 0.16 |
| 4 | CTP | 4.0 | THF | 1.25 | 0.95 | 0.30 |

Duration = 24 h
Temp = 50° C.
CTA = cellulose triacetate
CTP = cellulose tripropionate Reaction of CTA (cellulose triacetate) with TBAF in DMSO (CTA is insoluble in THF) afforded deacylation that was also selective for the secondary acetates, albeit less so than observed in THF with the DS 2.42 CA. Reaction of CTA with TBAF in THF (the CTA dissolves as it reacts) was also successful, with similar regioselectivity to that observed in DMSO. Deacylation of CTP (cellulose tripropionate) by TBAF in THF (in which CTP is soluble) was also effective, as well as regioselective in similar fashion as for the cellulose acetates. In the case of CTP, regioselectivity is high in both THF and DMSO. In similar fashion, deacylation of either cellulose tri(hexanoate) or cellulose tribenzoate by TBAF in THF gives regioselectively substituted O-6 cellulose ester with similar regioselectivity to that observed with cellulose triacetate or tripropionate.

Although the exact mechanism of the deacylation reaction may not be completely understood, it seems likely that this unusual reaction may be the result either of nucleophilic attack of $F^-$ upon the acyl carbonyls, producing acyl fluoride as an intermediate that is then hydrolyzed by water (either adventitious, or the TBAF waters of hydration), or by general base catalysis by $F^-$. The observed regioselectivity, in which deacylation occurs not at the less hindered 6-O-acetate, but rather at the acetates of the secondary alcohols at the 2- and 3-O positions, argues against the nucleophilic displacement mechanism. If such a mechanism were operative, precisely the opposite regioselectivity would be expected. It is suspected that a general base-catalyzed mechanism may be occurring, and that the key step is deprotonation of the acyl moieties alpha to the carbonyl group. Subsequent elimination of a ketene, and capturing of the ketene by water affords the carboxylic acid, as illustrated in Scheme 3:

Scheme 3. Deacylation Mechanism.

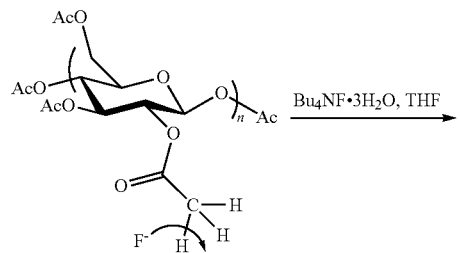

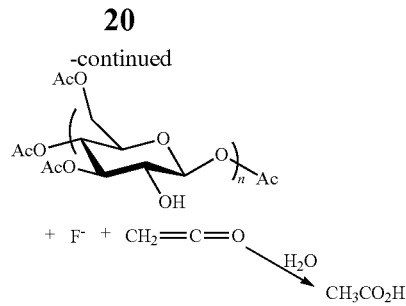

Note that it is also in accord with the chemoselectivity observed by Rinehart and co-workers (Namikoshi 1991) that the acidity of the α-proton in p-nitrobenzyl esters is much higher than that of the benzyl ester α-proton.

The deacylation reactions typically all proceed, in THF at equivalent temperature and TBAF/anhydroglucose molar ratio, to similar extent after 24 h. Approximately 1.5-1.7 DS acyl is removed in each case. This could be the result of increasing moderation of the basicity of the $F^-$ ion as the carboxylic acid co-product is generated. Another limiter for the extent of deacylation could be the availability of water for reaction with the ketene co-product (which if not consumed by hydrolysis would be expected to simply reacylate cellulose). If the TBAF trihydrate is the only source of water, then there are approximately 12 molar equivalents per AGU of water available, or roughly 7.5 equiv (12 mol $H_2O$/1.6 mol acyls removed) per mol of putative ketene generated. While this is an excess of available water, it is possible that the removal of the second water of TBAF hydration is significantly more energetically unfavorable than removal of the first water of hydration.

While the regioselectivity for deacylation at O-2 and O-3 is not yet fully understood, it would be consistent with the proposed mechanism if relief of steric hindrance in the ground state were a key driver; removal of a proton and generation of a ketene from the O-2- and O-3-esters relieves more ground state steric strain than deacylation of the O-6 ester.

Deacylation of cellulose esters has clear potential as a single-step synthesis of highly regioselectively substituted cellulose 6-O-esters, as well as being a simple route to the cellulose-2,3-O-(ester 1)-6-O-(ester 2) esters (for example, cellulose-2,3-O-dibutyrate-6-O-acetate) which can easily be prepared from them. Embodiments of the invention also include application of this deacylation reaction to other polysaccharide and carbohydrate esters, as well as well as regioselectively substituted polysaccharide and carbohydrate derivatives.

The mechanism of TBAF regioselective deacylation of cellulose acetates was further investigated by studying the kinetics of the reaction and the effect of the presence of added base to clarify the ketene intermediate mechanism. Ammonium chelation by the carbonyl oxygen of cellulose acetates as well as the impact of the tetraalkylammonium cation size on the deacylation reaction were investigated.

Kinetic Isotopic Effects.

Kinetic isotopic effects (KIE) are widely used to elucidate the reaction mechanisms by determining the rate determining step and the transition states. Hydrogen atoms of the acetate groups were replaced by deuterium by using acetyl chloride-$d_3$ to react with cellulose directly. Scheme 4 shows the reaction process:

Scheme 4. TBAF deacylation of cellulose triacetates in DMSO.

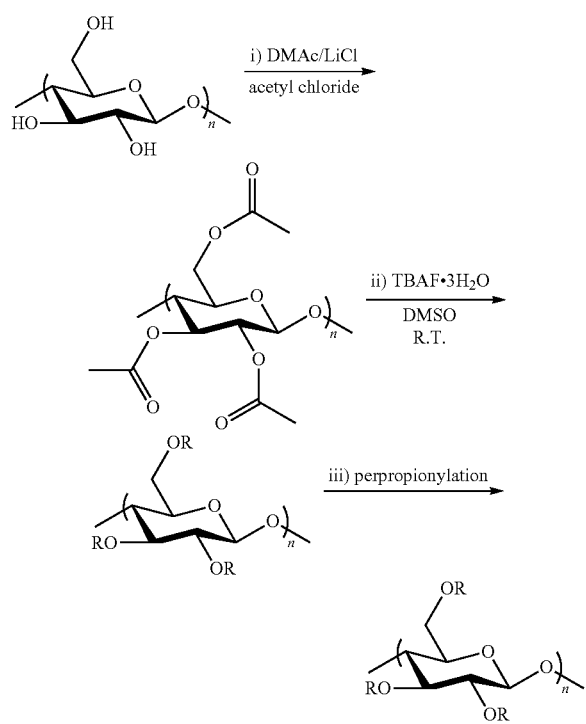

R = Acetyl or propionyl

Samples from the cellulose triacetate TBAF deacylation reaction solution were removed every 15 min, quenched, precipitated, and the solid product collected by filtration and dried. The DS of the product was determined by $^1$H NMR (proton nuclear magnetic resonance) of its perpropionylated derivative.

As shown in Scheme 4, embodiments of regioselective substitution of carbohydrate and polysaccharide derivatives, in particular esters, can be performed by first preparing or providing the derivative. As illustrated, cellulose triacetate can be prepared, then an appropriate fluoride or hydroxide salt and solvent added to cause selective deacylation of the cellulose triacetate. For analysis purposes, the product can be optionally treated to obtain a perpropionylated product. Here, synthesis of cellulose triacetate is shown, then TBAF deacylation in DMSO is performed, and optionally perpropionylation of the deacylation product is performed to obtain a product that can be analyzed by one or more analytical techniques for determining the degree and location of selective substitution (of course, preparative scale peracylation can also be used to prepare regioselectively substituted cellulose triesters).

For the TBAF deacylation reaction, the reaction rate has the form:

$$d[acetate]/dt = k[acetate][TBAF],$$

where k is the reaction rate constant which depends on temperature, [acetate] is the concentration of the resulting cellulose acetate, [TBAF] is the concentration of TBAF.

Measuring the concentration of TBAF can be problematic, however, in some circumstances. Here, the pseudo-first-order condition was achieved to solve this problem by using 20-fold excess of TBAF, and thus the concentration of TBAF can be treated as a constant during the reaction. The reaction rate can be modified as below:

$$d[acetate]/dt = k'[acetate],$$

where $k' = k[TBAF]$ (with units $s^{-1}$), $[acetates] = DS_{acetates}$ [cellulose triacetates]$_0$.

After integration, the following equation can be obtained:

$$-\log[acetates] = k't - \log[acetates]_0.$$

The pseudo-first-order rate constants k' were obtained from the linear plots of log [acetates] against time and were proved to be reproducible to within ±4% by duplicated kinetic runs. This pseudo-first-order approximation is straightforward and a reliable method for obtaining the rate constant and KIE of the TBAF deacylation reaction.

Due to the fact that TBAF mediated deacylation shows very high regioselectivity for removal of the secondary acetate groups at C-2 and C-3, it was speculated that the reaction mechanisms at C-2/3 and C-6 could be different and the reaction rate constants would also be different for the reaction at secondary acetates and primary acetates. To evaluate this further, a plot of the log [acetates] against time at C-2/3 and C-6 were separately prepared.

Figure 2A:
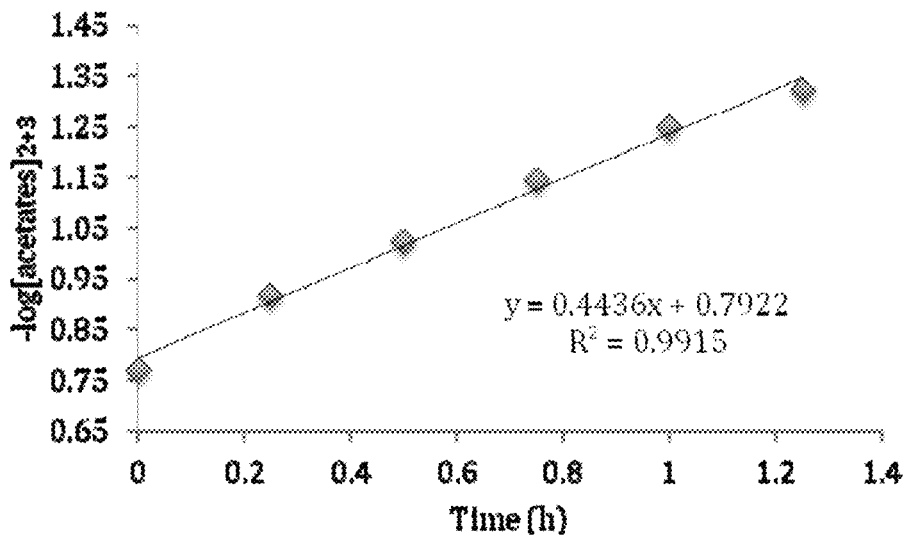
FIGS. 2A-B are graphs illustrating the different reaction rate constants at C-2/3 and C-6 for cellulose acetate.
Figure 2B:
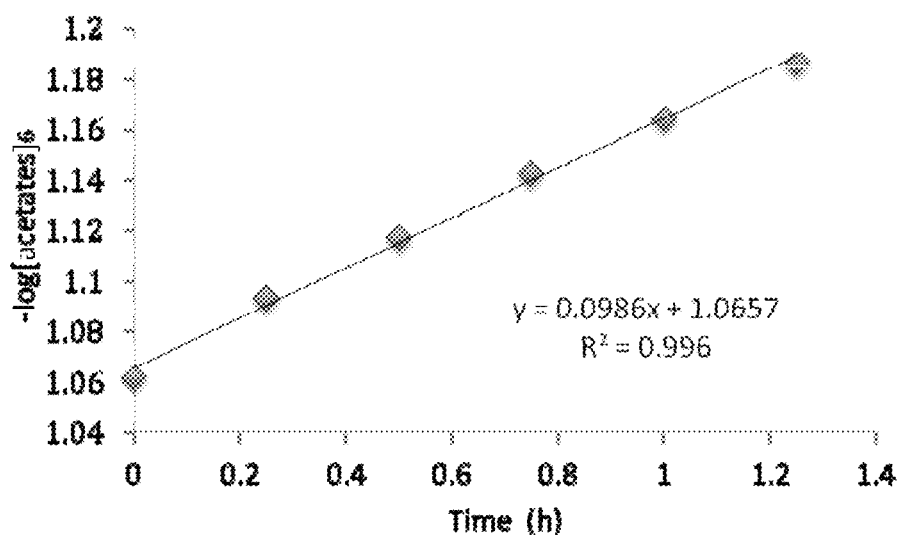

As presented in FIGS. 2A-B, a good linear dependence of log [acetates] on the time at both positions was observed. Plotting log [acetates]$_{2+3}$ versus time yields a straight line of slope 0.4436, while plotting log [acetates]$_6$ versus time affords a straight line of slope 0.0986. The reaction rate constants at C-2/3 and C-6 are strikingly different, which supports the hypothesis that the mechanism at secondary acetates group and primary acetates group are different. With the same method, the rate constants for the deuterated cellulose triacetates at C-2/3 and C-6 were obtained, which are 0.3503 and 0.1092 respectively. A normal secondary KIE of 1.3 is obtained for the reaction at secondary acetates and a reversed secondary KIE of 0.9 is acquired at primary acetates.

The observation of the small deuterium isotope effect of 1.3 at C-2/3 means that the C—H (alpha to the carbonyl group) bond-breaking is not the rate determining step. The source of the secondary KIE for the deacylation reaction at C-2/3 can be elucidated by the following analysis. The C—H (alpha to the carbonyl group) bond-breaking should provide a primary KIE, while an $sp^2 \rightarrow sp^3$ rehybridization at the carbonyl C-atom should give inverse secondary KIE ($k_H/k_D<1$), which can be attributed to the fact that the larger protium (compared with deuterium) increases the steric hindrance and makes nucleophilic attack upon the acetate carbonyl harder, which correspondingly lowers the reaction rate constant for protium substituted substrate and KIE<1 is obtained.

In this particular case, the observed secondary KIE at C-2/3 can be ascribed to the acetate C—O bond-breaking in the rate determining step, as shown in Scheme 5:

Scheme 5. Ketene Intermediate Mechanism at C-2/3.

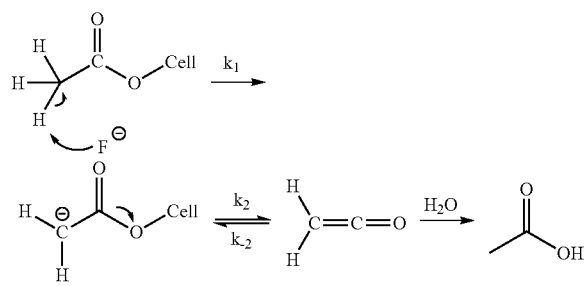

The first step is that the fluoride anion abstracts the alpha proton generating a carbanion and the second step is that the electron pair expels the cellulose backbone which acts as the leaving group, forming ketone. The first step to the carbanion is fast due to the concentrated TBAF (20 mol/mol AGU), which increases the ground state energy of reactants and lowers the energy required to enter transition state. The second step cellulose backbone being expelled reversibly is slow, being the rate determining step of the deacylation reaction at secondary acetates.

The inverse secondary kinetic isotope effect of 0.9 observed at C-6 can be explained by the $sp^2 \rightarrow sp^3$ rehybridization at the acetate carbonyl. The mechanism at C-6 can be either nucleophilic attack by fluoride anion upon the acyl carbonyls, producing acyl fluoride as an intermediate that is then hydrolyzed by TBAF waters of hydration, or a general-base mechanism, deprotonating of water by fluoride anion, followed by OFF-mediated ester hydrolysis. In order to test whether the fluorine nucleophilic attack or the general base process is the mechanism, the effect of added base was additionally evaluated.

Effect of Added Base.

To obtain more information about the mechanism at C-6, whether the presence of added base affects the deacylation rate was investigated. The presence of base should have a profound role on the deacylation at C-6 if a general base mechanism is operative, but a negligible role if nucleophilic fluorine attack is occurring. Compared to TBAF alone, the presence of $Na_2CO_3$ (entries 4 and 5 of Table 3) gives inferior selectivity for the deacylation with a greater extent of deacylation at C-6, while maintaining the same extent of deacylation at C-2/3 as in entry 2, which supports the general-base mechanism at C-6.

TABLE 3

Effect of Sodium Bicarbonate on TBAF deacylation of CA

| Entry | TBAF (mol/AGU) | $Na_2CO_3$ (mol/AHG) | $DS_6$ | $DS_{2+3}$ | $DS_{total}$ |
|---|---|---|---|---|---|
| 1 | 0 | 0 | 0.82 | 1.60 | 2.42 |
| 2 | 4 | 0 | 0.80 | 0.10 | 0.90 |

TABLE 3-continued

Effect of Sodium Bicarbonate on TBAF deacylation of CA

| Entry | TBAF (mol/AGU) | $Na_2CO_3$ (mol/AHG) | $DS_6$ | $DS_{2+3}$ | $DS_{total}$ |
|---|---|---|---|---|---|
| 3 | 0 | 4 | 0.82 | 1.60 | 2.42 |
| 4 | 4 | 0.75 | 0.57 | 0.11 | 0.68 |
| 5 | 4 | 1.50 | 0.44 | 0.10 | 0.54 |

Starting cellulose acetate, DS 2.42
Reaction Temp. = 50° C.
Solvent = DMSO

As presented in Scheme 6 below, the fluoride anion deprotonated the water of hydration and the resulting OH⁻ mediated base-catalyzed acetate hydrolysis:

Scheme 6. General-Base Mechanism at C-6.

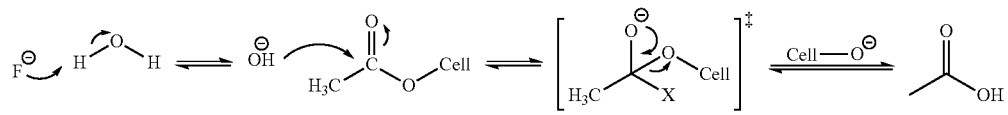

The reactions of CA with TBAF always provided cellulose acetates with similar DS (Ac) at C-2 and C-3, which implies some kind of chelation between TBAF and cellulose acetate. Complex 1 gives a tentative illustration of this hypothesis: The ammonium ion of TBAF forms a complex with the acetates carbonyl oxygen at C-2/3, which localizes the fluoride anion at C-2/3 and provides regioselective deacylation at C-2/3.

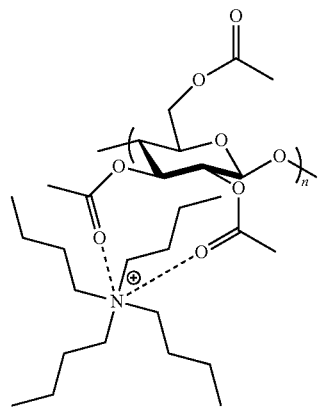

Complex 1.
Tentative Structure of Ammonium-Acetate Complex.

To test the hypothesis of tetraalkylammonium-acetate complex controlled regioselectivity, several additional experiments were carried out. Materials and methods used include, microcrystalline cellulose (MCC, Avicel PH-101) and cellulose acetate (CA-398-30, Eastman) that were dried under vacuum before use. TBAF, TBAOH, TEAOH, and TMAOH were purchased from Acros Organics and used as received. DMSO, dimethyl acetamide (DMAc), and pyridine were obtained from Fisher and dried over molecular sieves (Type 4 Å, 8-12 mesh beads). Acetyl chloride, acetyl chloride-$d_3$, propionic anhydride, were acquired from Aldrich. NMR spectra were recorded on AVANCE500.

Cellulose triacetates were prepared by the method of Heinze, Liebert, Pfeiffer and Hussain. See Heinze, T., Liebert, T., Pfeiffer, K., Hussain, M., Cellulose 2003, 10, pp. 283-296. In particular, cellulose triacetates were prepared by adding acetyl chloride to the cellulose solution, heating to 80° C. for 2 h, keeping at room temperature for 24 h, precipitating into ethanol, and drying in vacuum at 50° C. The sample was further perpropionylated for DS determination. Deuterated cellulose triacetates were prepared in a similar fashion by adding acetyl chloride-$d_3$ to the cellulose solution. Perpropionylation of the deuterated sample was conducted to confirm the degree of substitution (DS).

More particularly, the tetraalkylammonium fluoride/hydroxide deacylation of cellulose acetates was generally performed as follows. To a solution of cellulose acetate in DMSO (40 mL per 1 g of CA) was added tetraalkylammonium fluoride/hydroxide (4 mol/mol AGU, unless otherwise stated) at 50° C. After 24 h, the reaction solution was precipitated in water (250 mL) and the product isolated by filtration, then washed several times with water. The product was dried under vacuum.

Perpropionylation of the deacylation product. 4-(Dimethylamino)pyridine (15 mg) and propionic anhydride (3 mL) were added to the solution of deacylation product in pyridine (3 mL) at 80° C. After 24 h, the reaction solution was precipitated in ethanol (150 mL) and the product isolated by filtration, then washed several times with ethanol. The crude product was redissolved in chloroform (5 mL) and re-precipitated into ethanol (150 mL), isolated by filtration, then washed several times with ethanol. The product was dried under vacuum to give the perpropionylated product for NMR analysis.

Protonated/deuterated cellulose triacetate (2.50 g, 8.68 mmol AGU) was dissolved in 100 mL of DMSO and 57.89 g TBAF (20 mol/mol AGU) added with mechanical stirring at 20° C. 20 mL of reaction solution was removed each 15 min and precipitated in 200 mL water. After drying in vacuum overnight, the sample was perpropionylated for DS analysis by NMR.

Results are shown in Table 4:

TABLE 4

Results of TBAX and TBAOH Deacylation of CA

| Entry | TBAX (mol/AGU) | X | $DS_{total}$ | $DS_6$ | $DS_2$ | $DS_3$ |
|---|---|---|---|---|---|---|
| 1 | 0 | F | 2.42 | 0.82 | 0.80 | 0.80 |
| 2 | 1 | F | 1.54 | 0.82 | 0.35 | 0.37 |
| 3 | 2 | F | 1.27 | 0.82 | 0.22 | 0.23 |
| 4 | 3 | F | 1.07 | 0.80 | 0.12 | 0.14 |
| 5 | 4 | F | 0.90 | 0.80 | 0.05 | 0.05 |
| 6 | 5 | F | 0.66 | 0.64 | 0.01 | 0.01 |
| 7 | 6 | F | 0.56 | 0.56 | 0.00 | 0.00 |
| 8 | 1 | OH | 1.45 | 0.82 | 0.31 | 0.32 |
| 9 | 1.6 | OH | 1.02 | 0.77 | 0.10 | 0.10 |
| 10 | 4 | OH | 0 | 0 | 0 | 0 |

Starting cellulose acetate, DS 2.42
Reaction Temp. = 50° C.
Time = 24 h
Solvent = DMSO With limited TBAF (entries 2-3), the deacylation first occurred at C-2/3 with almost the same DS (Ac) at C-2 and C-3. On the other hand, excess TBAF (entries 4-7) afforded substantial deacylation at C-2/3 and some deacylation at C-6 since there was enough TBAF to react with acetates at C-6. One may assume that, if the chelation does exist, limited TBA hydroxide (TBAOH) would also selectively deacylate the acetates at C-2/3, otherwise it would show selectivity for the primary acetates with less steric hindrance. In order to check this hypothesis, the TBAOH deacylation of CA was performed at the same reaction conditions as TBAF (entries 8-10). As shown, it can be seen that exposure of CA to 4 mol/AHG TBAOH gave complete deacylation of CA, while reaction with 1 mol/AHG TBAOH provided the same deacylation at C-2 and C-3 through base-catalyzed ester hydrolysis mechanism with preservation of the O-6 acetyl. Reaction with 1.6 mol/AHG TBAOH gave a cellulose acetate with DS (Ac) at C-2/3 of 0.20 and DS (Ac) at C-6 of 0.77. Taken as a whole, these results are in agreement with the hypothesis of ammonium-ion chelation by cellulose acetate, which governs the observed regioselectivity.

Ammonium-chelation controlled regioselectivity was tested by using two other tetraalkylammonium hydroxides, namely, tetraethylammonium hydroxide (TEAOH) and tetramethylammonium hydroxide (TMAOH). The results are summarized in Table 5.

TABLE 5

Tetraalkylammonium Hydroxide Deacylation of CA

| Entry | Tetraalkylammonium hydroxide | $DS_{total}$ | $DS_6$ | $DS_2$ | $DS_3$ |
|---|---|---|---|---|---|
| 1 | TBAOH | 0.97 | 0.77 | 0.10 | 0.10 |
| 2 | TEAOH | 0.83 | 0.67 | 0.08 | 0.08 |
| 3 | TMAOH | 0.74 | 0.60 | 0.07 | 0.07 |

Starting cellulose acetate, DS 2.42
tetraalkylammonium hydroxide 1.6 mol/AHG
solvent DMSO Reaction of CA with 1.6 mol/AHG TEAOH and TMAOH in DMSO gave similar deacylation that was selective for the secondary acetates as TBAOH with the same DS (Ac) at C-2 and C-3. It was also apparent that the shorter alkyl chain enhanced the deacylation at both C-2/3 and C-6.

Additionally, the impact of fluoride counterion was tested by using alkali metal fluoride, such as potassium fluoride dihydrate (KF), and two other tetraalkylammonium fluorides, namely, tetraethylammonium fluoride hydrate (TEAF) and tetramethylammonium fluoride tetrahydrate (TMAF). The results are summarized in Table 6.

Exposure of CA to the alkali metal fluoride KF in methyl ethyl ketone (MEK) gave no deacylation (entry 2). Reaction of CA with 1.6 mol/AHG TEAF in DMSO (entry 4) gave similar deacylation that was selective for the secondary acetates as TBAOH with the same DS (Ac) at C-2 and C-3 but the selectivity is not as good as TBAF. However, reaction with TMAF in DMSO (entry 5) gave reduced region-selectivity, with substantial deacylation of the 6-O acetate. It is apparent that with smaller counterion, the regioselectivity for the tetraalkylammonium fluoride deacylation of CA at secondary acetates decreases.

TABLE 6

Akali Metal Fluoride and Tetraalkylammonium Fluoride Deacylation

| Entry | Fluoride source | Solvent | $DS_{total}$ | $DS_6$ | $DS_2$ | $DS_3$ |
|---|---|---|---|---|---|---|
| 1 | TBAF | MEK | 0.92 | 0.80 | 0.06 | 0.06 |
| 2 | KF | MEK | 2.40 | 0.80 | 0.80 | 0.80 |
| 3 | TBAF | DMSO | 0.90 | 0.80 | 0.05 | 0.05 |

TABLE 6-continued

Akali Metal Fluoride and Tetraalkylammonium Fluoride Deacylation

| Entry | Fluoride source | Solvent | $DS_{total}$ | $DS_6$ | $DS_2$ | $DS_3$ |
|---|---|---|---|---|---|---|
| 4 | TEAF | DMSO | 1.05 | 0.80 | 0.12 | 0.13 |
| 5 | TMAF | DMSO | 0.49 | 0.37 | 0.06 | 0.06 |

Starting cellulose acetate, DS 2.42;
Tetraalkylammonium fluoride and potassium fluoride 4 mol/AHG;
Reaction temperature 50° C.;
Time 24 h.

The present invention has been described with reference to particular embodiments having various features. One skilled in the art will recognize that these features may be used singularly or in any combination based on the requirements and specifications of a given application or design. For example, with respect to particular methods disclosed herein it is understood that any one or more of the method steps can be omitted, added to another method, or performed in a different order than disclosed. Other embodiments of the invention will be apparent to those skilled in the art from consideration of the specification and practice of the invention. Where a range of values is provided in this specification, each value between the upper and lower limits of that range is also specifically disclosed. The upper and lower limits of these smaller ranges may independently be included or excluded in the range as well. All numbers and ranges disclosed above may vary by some amount. As used in this specification, the singular forms "a," "an," and "the" include plural referents unless the context clearly dictates otherwise. While compositions and methods are described in terms of "comprising," "containing," or "including" various components or steps, the compositions and methods can also "consist essentially of" or "consist of" the various components and steps. It is intended that the specification and examples be considered as exemplary in nature and that variations that do not depart from the essence of the invention are intended to be within the scope of the invention.

Further, the references cited in this disclosure are hereby incorporated by reference herein in their entireties, especially for information that is well known in the art for example with respect to use, effectiveness, or preparation of the inventive regioselectively substituted carbohydrate and polysaccharide derivatives. For example, inventive products included within the scope of the invention include products identified previously if capable of being prepared according to a method disclosed herein. If there is any conflict in the usages of a word or term in this specification and one or more patent or other documents that may be incorporated herein by reference, definitions consistent with this specification should be adopted.

The invention claimed is:

1. A method of preparing a regioselectively substituted ester comprising:
providing or synthesizing an ester from a selected carbohydrate or polysaccharide having a plurality of anhydroglucose repeating units;
providing a solvent capable of dissolving the carbohydrate or polysaccharide;
providing a tetraalkylammonium fluoride or hydroxide salt capable of selectively deacylating the ester in the solvent; and
reacting the ester and the tetraalkylammonium fluoride or hydroxide salt in the solvent for a time and under conditions sufficient to obtain a desired ester product which has been regioselectively deacylated at the C-2 and C-3 positions of the anhydroglucose repeating units, substantially retaining its ester substituent at the C-6 position of the anhydroglucose repeating units.

2. The method of claim 1, wherein the carbohydrate or polysaccharide is chosen from monosaccharides, disaccharides, and trisaccharides, or linear or branched polysaccharide or oligosaccharide molecules comprising monosaccharide, disaccharide, or trisaccharide repeating monomer units.

3. The method of claim 2, wherein the monosaccharides, disaccharides, and trisaccharides are chosen from glucose, sucrose, lactose, cellobiose, mannose, amylose, xylose, ribose, galactose, arabinose, fructose, sorbose, cellotriose and raffinose.

4. The method of claim 1, wherein the ester product is one or more ester chosen from cellulose acetates, cellulose propionates, cellulose butyrates, cellulose hexanoates, and cellulose benzoates.

5. The method of claim 1, wherein the solvent is chosen from one or more of methyl ethyl ketone (MEK), tetrahydrofuran (THF), dimethyl sulfoxide (DMSO), 1,3 dimethyl-2imidazolidinone (DMI), dimethylacetamide (DMAC), dioxane, dimethylformamide (DMF), ethyl acetate (EtOAc), butyl acetate (BuOAc), trichloromethane ($CHCl_3$), dichloromethane ($CH_2Cl_2$), or combinations thereof.

6. The method of claim 1, wherein the fluoride or hydroxide salt is provided by one or more of tetramethylammonium fluoride or hydroxide; or tetraethylammonium fluoride or hydroxide; tetrabutylammonium fluoride or hydroxide; tetraoctylammonium fluoride or hydroxide; or an alkali metal fluoride or hydroxide.

7. The method of claim 1, wherein the regioselectively substituted ester product is one or more esters comprising the following anhydroglucose repeating unit:

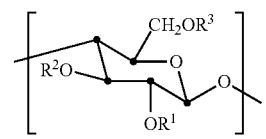

wherein R1, R2, and R3 are each independently chosen from a hydrogen atom, and,
whether substituted or unsubstituted, branched or unbranched, an alkanoyl group, an aroyl group,
and a heteroaroyl group comprising from 1-20 carbon atoms.

8. The method of claim 7, wherein the tetraalkylammonium fluoride or hydroxide salt is provided by tetrabutylammonium fluoride (TBAF) or tetrabutylammonium hydroxide (TBAOH), and the ester product is a cellulose acetate.

9. A method of preparing a regioselectively substituted ester comprising:
providing or synthesizing an ester from a selected carbohydrate or polysaccharide having a plurality of anhydroglucose repeating units;
providing a solvent capable of dissolving the carbohydrate or polysaccharide; providing a tetraalkylammonium fluoride or hydroxide salt capable of selectively deacylating the ester in the solvent; and
reacting the ester and the tetraalkylammonium fluoride or hydroxide salt in the solvent for a time and under conditions sufficient to obtain a desired ester product which has been regioselectively deacylated at one or more of the C-2 and C-3 positions of the anhydroglucose repeating units, substantially retaining its ester substituent at the C-6 position of the anhydroglucose repeating units;

wherein the regioselectively substituted ester product is one or more esters comprising the following anhydroglucose repeating unit:

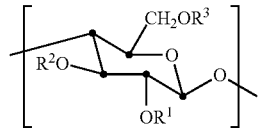

wherein R1, R2, and R3 are each independently chosen from a hydrogen atom, and, whether substituted or unsubstituted, branched or unbranched, an alkanoyl group, an aroyl group, and a heteroaroyl group comprising from 1-20 carbon atoms;

wherein the solvent is tetrahydrofuran (THF) or dimethylsulfoxide (DMSO), the tetraalkylammonium fluoride or hydroxide salt is provided by tetrabutylammonium fluoride (TBAF) or tetrabutylammonium hydroxide (TBAOH), and the ester product is a cellulose acetate.

* * * * *